US012307588B2

(12) United States Patent
Gupta et al.

(10) Patent No.: US 12,307,588 B2
(45) Date of Patent: May 20, 2025

(54) METHOD AND ELECTRONIC DEVICE FOR GENERATING PARTIAL VIRTUAL MODEL OF OBJECTS

(71) Applicant: Samsung Electronics Co., Ltd., Suwon-si (KR)

(72) Inventors: Vipul Gupta, Hisar (IN); Abhinav Gaba, Panipat (IN); Rahul Agrawal, Gwalior (IN); Govind Maheshwari, Distt-Budaun (IN); Nitesh Goyal, Indirapuram (IN); Kalgesh Singh, New Delhi (IN)

(73) Assignee: Samsung Electronics Co., Ltd., Suwon-si (KR)

(*) Notice: Subject to any disclaimer, the term of this patent is extended or adjusted under 35 U.S.C. 154(b) by 129 days.

(21) Appl. No.: 18/156,111

(22) Filed: Jan. 18, 2023

(65) Prior Publication Data
US 2023/0162440 A1 May 25, 2023

Related U.S. Application Data

(63) Continuation of application No. PCT/KR2021/008818, filed on Jul. 9, 2021.

(30) Foreign Application Priority Data

Jul. 23, 2020 (IN) .............................. 202041031596
Jun. 21, 2021 (KR) ........................ 10-2021-0080202

(51) Int. Cl.
*G06T 17/00* (2006.01)
*G06T 7/60* (2017.01)
(Continued)

(52) U.S. Cl.
CPC ................ *G06T 17/00* (2013.01); *G06T 7/60* (2013.01); *G06V 10/70* (2022.01); *H04N 23/632* (2023.01)

(58) Field of Classification Search
None
See application file for complete search history.

(56) References Cited

U.S. PATENT DOCUMENTS 10,043,315 B2   8/2018   Meier et al.
10,373,380 B2   8/2019   Kutliroff et al.
(Continued)

FOREIGN PATENT DOCUMENTS

EP   2 779 633 B1   8/2018
JP   2009-071478 A   4/2009
(Continued)

OTHER PUBLICATIONS

Irie, Mashu, and Tatsuya Shibata. "System of delivering virtual object to user in remote place by handing gestures." Proceedings of the 24th ACM Symposium on Virtual Reality Software and Technology. 2018.*

(Continued)

*Primary Examiner* — Ryan M Gray
(74) *Attorney, Agent, or Firm* — Jefferson IP Law, LLP

(57) ABSTRACT

A method for generating a virtual model of objects is provided. The method includes detecting, by a first electronic device, a communication session with a second electronic device, obtaining a first set of objects displayed on the first electronic device and a second set of objects displayed on the second electronic device based on the detection of the communication session, determining a first object from the first set of objects to be mapped to a second object from the second set of objects, predicting attributes of visible portions of the first object and the second object by mapping the first object to the second object, obtaining depth information related to the first object and the second object, and generating a virtual model of the first object and the second object based on the attributes of the visible portions of the first (Continued)

object and the second object and the depth information related to the first object and the second object.

18 Claims, 27 Drawing Sheets

(51) Int. Cl.
 *G06V 10/70* (2022.01)
 *H04N 23/63* (2023.01)

(56) References Cited

U.S. PATENT DOCUMENTS

| | | | |
|---|---|---|---|
| 10,609,332 B1 | 3/2020 | Turbell et al. | |
| 11,113,883 B2 | 9/2021 | Zia et al. | |
| 11,861,674 B1* | 1/2024 | Huang | G06F 16/90332 |
| 2015/0091891 A1 | 4/2015 | Raheman et al. | |
| 2017/0103160 A1* | 4/2017 | Hynes | G09B 9/058 |
| 2017/0237941 A1 | 8/2017 | Vats | |
| 2018/0088787 A1* | 3/2018 | Bereza | G06F 3/04815 |
| 2019/0156585 A1* | 5/2019 | Mott | G06F 3/011 |
| 2019/0362561 A1* | 11/2019 | Lin | G06T 7/50 |
| 2020/0202419 A1 | 6/2020 | Beauchamp | |
| 2020/0372626 A1* | 11/2020 | Dal Mutto | G06T 7/0002 |
| 2020/0410763 A1* | 12/2020 | Hare | G06T 15/04 |
| 2021/0065285 A1* | 3/2021 | Goldberg | G02C 13/003 |
| 2021/0097768 A1* | 4/2021 | Malia | G06F 3/04845 |
| 2021/0192856 A1* | 6/2021 | Lee | G06T 19/20 |
| 2022/0414945 A1* | 12/2022 | Kohara | G09G 5/00 |
| 2024/0020921 A1* | 1/2024 | Rokutan | G06T 17/00 |
| 2024/0271953 A1* | 8/2024 | Jang | B60K 35/23 |

FOREIGN PATENT DOCUMENTS

| | | | |
|---|---|---|---|
| KR | 10-2011-0066298 A | 6/2011 | |
| KR | 10-2015-0009789 A | 1/2015 | |
| KR | 10-1659066 B1 | 9/2016 | |
| KR | 10-1784266 B1 | 10/2017 | |
| KR | 10-2019-0024862 A | 3/2019 | |
| KR | 10-2092374 B1 | 3/2020 | |
| WO | WO-2016053029 A1 * | 4/2016 | G06Q 50/10 |

OTHER PUBLICATIONS

Tan Reuben et al. Learning Similarity Conditions Without Explicit Supervision. arXiv:1908.08589v1 . . . pp. 1-15, Aug. 2019 [Retrieved on: Sep. 6, 2021]. Retrieved from <URL: http://arxiv.org/pdf/1908.08589> See pp. 2 and 11; and figures 1 and 5-13.
International Search Report dated Oct. 18, 2021, issued in International Patent Application No. PCT/KR2021/008818.

* cited by examiner

FIG. 2C
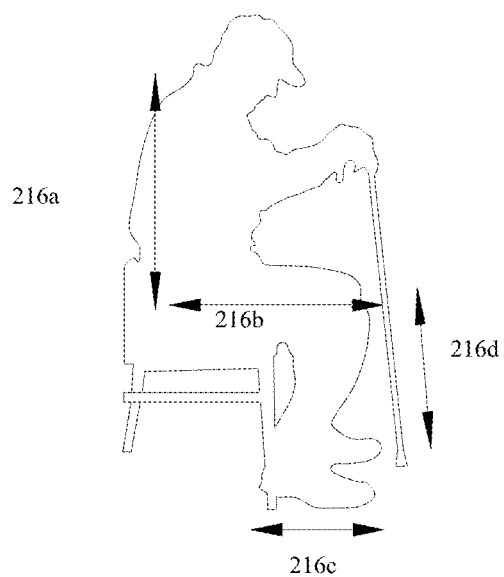
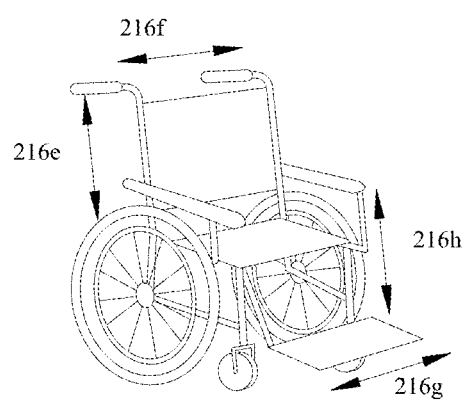

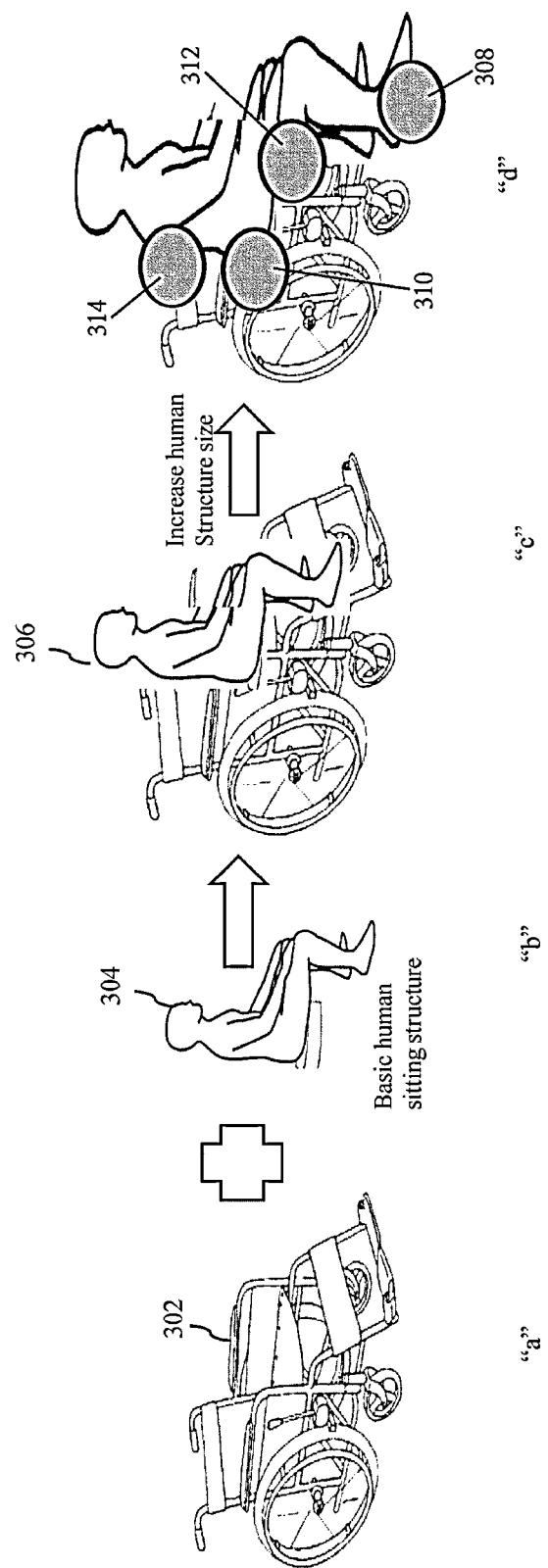

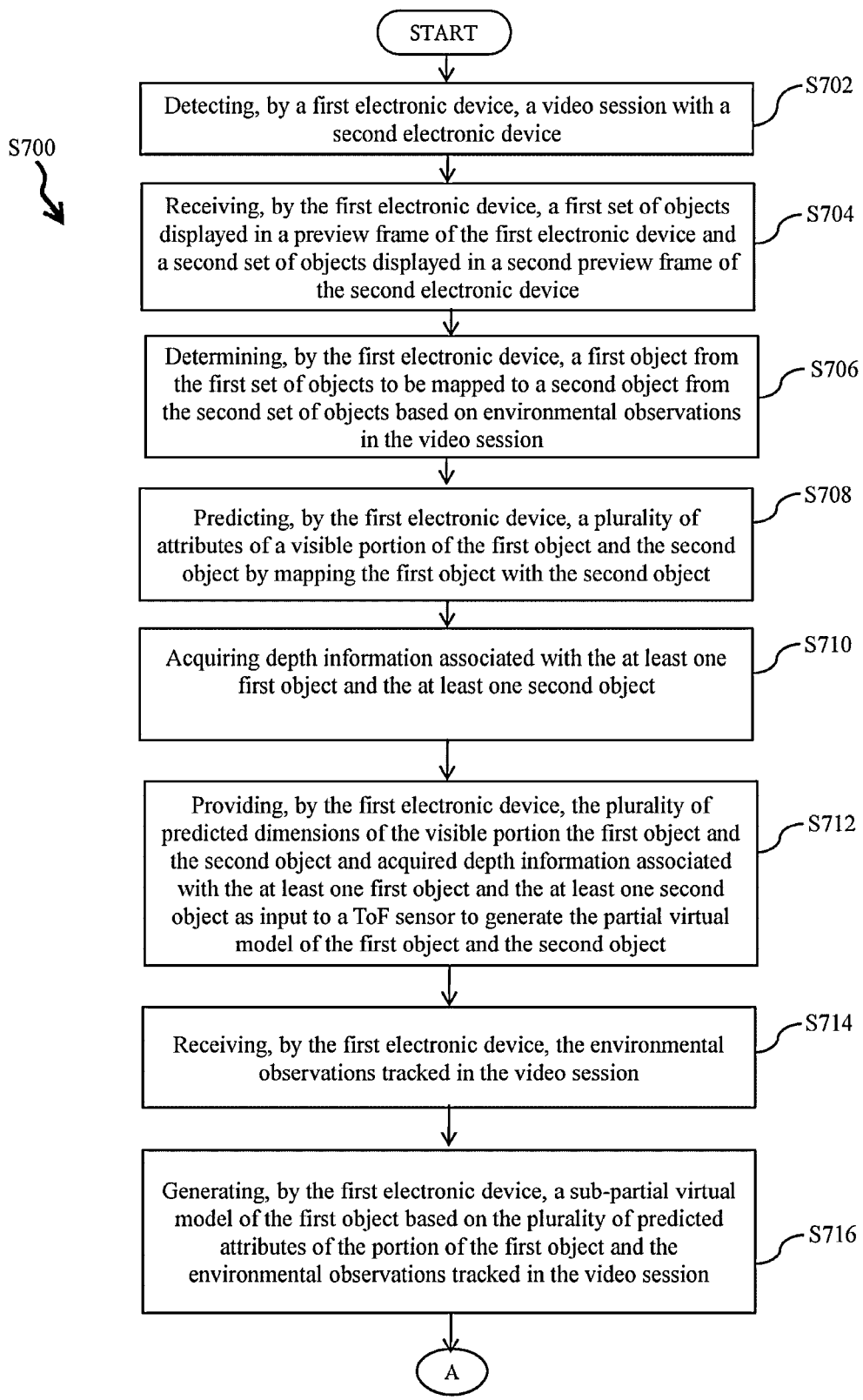

METHOD AND ELECTRONIC DEVICE FOR GENERATING PARTIAL VIRTUAL MODEL OF OBJECTS

CROSS-REFERENCE TO RELATED APPLICATION(S)

This application is a continuation application, claiming priority under § 365(c), of an International application No. PCT/KR2021/008818, filed on Jul. 9, 2021, which is based on and claims the benefit of an Indian patent application number 202041031596, filed on Jul. 23, 2020, in the Indian Intellectual Property Office, and of a Korean patent application number 10-2021-0080202, filed on Jun. 21, 2021, in the Korean Intellectual Property Office, the disclosure of each of which is incorporated by reference herein in its entirety.

BACKGROUND

1. Field

The disclosure relates to a virtual model generation system. More particularly, the disclosure relates to a method and electronic device for generating a partial virtual model of objects.

2. Description of Related Art

A user of an electronic device needs realistic viewing and interaction with remote objects or another user's to determine feasibility and comfort in using the product features. In existing methods, the method includes receiving audio and video frames of multiple locations having the another user/remote object at each location. Further, the method includes processing the video frames received from all the location to extract the another user/remote object by removing a background from the video frames of the location using multiple cameras. Further, the method includes merging the processed video frames with a predefined video frame to generate a merged video, so that the merged video gives an impression of co-presence of the another user/remote object from all locations. In another existing methods, the method includes receiving audio and video frames of multiple locations using multiple cameras. This results in consuming a large amount of resources (e.g., processing power, memory, battery, central processing unit (CPU) cycles, or the like) for processing the audio and video frames.

Further, existing method does not use any dynamic intelligence to predict dimension of parts of the another user/remote object which is not visible in the multiple cameras. Further, in another existing method, a time of flight (TOF) sensor generates a complete 3D model even need of complete model is not required. There is no mechanism of generating only partial model of objects as required by a user.

FIG. 1 is an example scenario in which a user of a first electronic device is speaking with a user of a second electronic device about a problem of using their wheelchair bought over a video call, according to the related art.

Referring to FIG. 1, consider the scenario, a user (102) of a first electronic device (100a) is speaking with a user (104) of the second electronic device (100b) about their health condition and problem of using wheelchairs (106 and 108) as follows. The first electronic device (100a) "Hey dude! How is your recovery going on?" Second electronic device (100b) "Hello Tom! The recovery is ok, but I am using the wheelchair (108), the wheelchair (108) is so uncomfortable to me, and I could not even fit in properly".

First electronic device (100a) "The same thing happened with me. Even though I have selected this wheelchair (106) over a video call. But this is so uncomfortable! I wish the video call could have helped with the dimension to buy the wheelchair (106)".

Referring to FIG. 1, the existing method does not use any dynamic intelligence to predict dimension of parts of the wheelchair (106 and 108) which is not visible in the multiple cameras. This results in inconvenience to the user.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and electronic device for generating a partial virtual model of objects by capturing only visible portions of the objects in a video session. This resulting a low resource usage (e.g., CPU power cycles, battery, memory or the like) of the electronic device for creating the partial virtual model of objects.

Another aspect of the disclosure is to generate the partial virtual model of objects without requiring any special efforts required from a user to predict dimensional mapping of the objects while creating the partial virtual model of the objects.

Another aspect of the disclosure is to generate the partial virtual model of objects by capturing a visible portion of the first object and the visible portion of the second object and predict hidden dimensions of the first object and hidden dimensions of the second object. This resulting the low resource usage of the electronic device for creating the partial virtual model of objects.

Additional aspects will be set forth in part in the description which follows and, in part, will be apparent from the description, or may be learned by practice of the presented embodiments.

In accordance with an aspect of the disclosure, a method for generating a partial virtual model of objects is provided. The method includes determining, by an electronic device, at least one first object from a first set of objects to be mapped to at least one second object from a second set of objects based on environmental observations. Further, the method includes predicting, by the electronic device, a plurality of attributes of at least one visible portion of the at least one first object and the at least one second object by mapping the at least one first object with the at least one second object. Further, the method includes providing, by the electronic device, the plurality of predicted dimensions of the at least one visible portion the at least one first object and the at least one second object as input to a sensor to generate the partial virtual model of the one first object and the at least one second object.

In accordance with another aspect of the disclosure, an electronic device for generating a partial virtual model of objects is provided. The electronic device includes a processor coupled with a memory and a partial virtual model controller. The partial virtual model controller is configured to determine at least one first object from a first set of objects to be mapped to at least one second object from a second set of objects based on environmental observations. Further, the partial virtual model controller is configured to predict a plurality of attributes of at least one visible portion of the at least one first object and the at least one second object by mapping the at least one first object with the at least one second object. Further, the partial virtual model controller is configured to provide the plurality of predicted dimensions of the at least one visible portion the at least one first object and the at least one second object as input to TOF sensor to generate the partial virtual model of the one first object and the at least one second object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 2A, 2B, 2C, 2D, 2E, and 2F illustrate example scenario in which a first electronic device generates a partial virtual model of objects during a video call, according to various embodiments of the disclosure;

FIG. 3 is an example scenario in which identifying points of structural intersection is depicted, according to an embodiment of the disclosure;

FIGS. 7A and 7B are an example flow chart illustrating a method for generating the partial virtual model of objects, according to an embodiment of the disclosure;

Throughout the drawings, it should be noted that like reference numbers are used to depict the same or similar elements, features, and structures.

DETAILED DESCRIPTION

Figure 1:
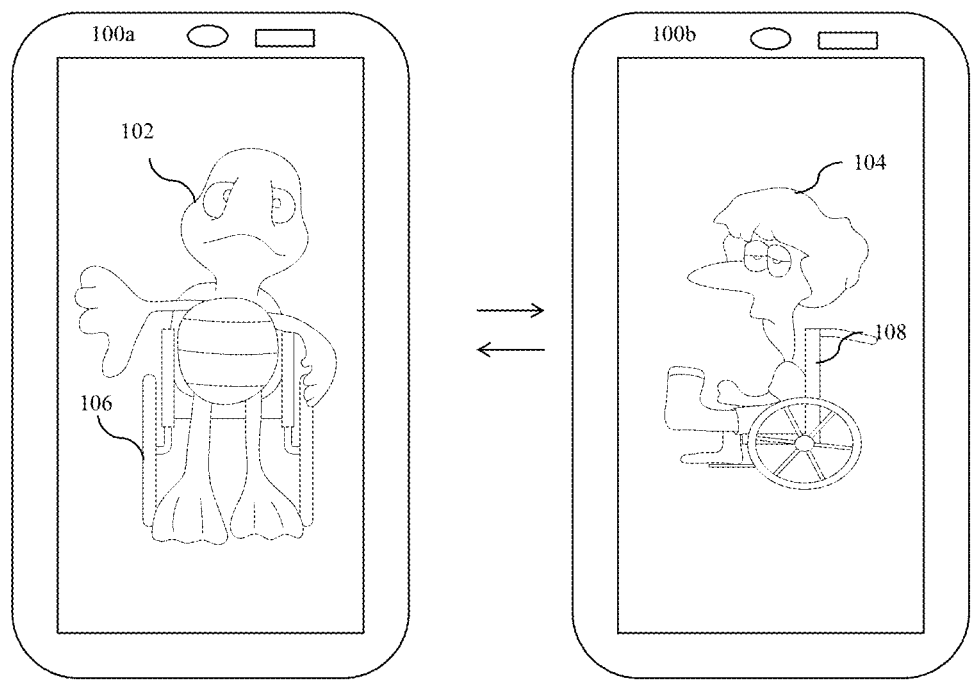
FIG. 1 illustrates an example scenario in which a user of a first electronic device is speaking with a user of a second electronic device about a problem of using a wheelchair bought over a video call, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and configurations may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, and the like, may be used herein to describe various elements, these elements should not be limited by these terms. These terms are generally only used to distinguish one element from another.

Accordingly, preferred embodiments herein achieve a method for generating a partial virtual model of objects. The method includes detecting, by a first electronic device, a video session with at least one second electronic device. Further, the method includes receiving, by the first electronic device, a first set of objects displayed in at least one preview frame of the first electronic device and a second set of objects displayed in at least one second preview frame of the second electronic device. Further, the method includes determining, by the first electronic device, at least one first object from the first set of objects to be mapped to at least one second object from the second set of objects based on environmental observations in the video session. Further, the method includes predicting, by the first electronic device, a plurality of attributes of at least one visible portion of the at least one first object and the at least one second object by mapping the at least one first object with the at least one second object. Further, the method includes providing, by the first electronic device, the plurality of predicted dimensions of the at least one visible portion the at least one first object and the at least one second object as input to a TOF sensor to generate the partial virtual model of the one first object and the at least one second object.

Unlike conventional methods and systems, the proposed method does not require multiple capture of objects from different camera positions, and capture only visible portions of the objects during the communication session (e.g., video call, chat session, an online streaming session, online conferencing session, or the like). The visible portions are scanned to intelligently create a three dimensional (3D) model. Thus resulting in a low resource usage (e.g., CPU power cycles, battery, memory, and the like) of the electronic device for creating the 3D model.

In the proposed method, there is no prerequisite required for any type of data for creating the 3D model. The electronic device considers real time dimensions of the object using the TOF sensor. Existing TOF sensor generates a complete 3D model even need of complete model is not required. There is no mechanism of generating only partial model of objects as required by the user. Hence, in the proposed method, only required portions of objects are mapped based on compatibility to generate the partial model. In the proposed method, the TOF sensor is used to create a 3D depth map for only required body part of the first object and the second object to predict the compatibility of the first object and the second object. This resulting the low resource usage of the electronic device for creating the 3D model.

The proposed method does not require any special efforts required from a user to predict dimensional mapping of the first object and the second object while creating the partial 3D model. In case, if any dimension which is predicted to be important could not be captured from frames present in the video session, the method may be used to predict that dimension using correction assumption technique.

In the proposed method, the electronic device utilizes only the required portion of the object to be used for 3D modelling and generate quick and partial 3D model of the object required for processing. The electronic device only captures the visible portion of the object and can predict the hidden dimensions with quite precision and accuracy.

Referring now to the drawings, and more particularly to FIGS. 2A through 9B, there are shown preferred embodiments.

FIGS. 2A to 2F are example scenario in which a first electronic device generates a partial virtual model of objects, according to various embodiments of the disclosure.

The object may be, for example, but not limited to a product and another user. The product may be, for example, but not limited to a chair, sofa, wheelchair, television, a refrigerator, a washing machine, and an internal component of an electrical item or the like. The first electronic device (100a) is in a video session with a second electronic device (100b). The first electronic device (100a) and the second electronic device (100b) may be, for example, but not limited to a smart phone, a Personal Digital Assistant (PDA), a tablet computer, a laptop computer, an Internet of Things (IoT), a virtual reality device, an immersive system, and a smart watch.

Referring to FIG. 2A to 2F, the first electronic device (100a) is configured to receive a first set of objects displayed in a preview frame of the first electronic device (100a) and a second set of objects displayed in a second preview frame of the second electronic device (100b). The first set of objects are in proximity to the first electronic device (100a) and the first preview frame is displayed in a field of view of a camera of the first electronic device (100a). Similarity, the second set of objects are in proximity to the second electronic device (100b) and the second preview frame is displayed in a field of view of a camera of the second electronic device (100b).

In another embodiment, the first electronic device (100a) is configured to receive the first set of objects displayed in the preview frame of the first electronic device (100a) and a second set of objects is already stored in the first electronic device (100a) as an image or a group of images.

Further, the first electronic device (100a) may be configured to determine a first object from the first set of objects to be mapped to a second object from the second set of objects based on environmental observations in the video session. Further, the first electronic device (100a) may be configured to predict a plurality of attributes of visible portion of the first object and the second object by mapping the first object with the second object. The plurality of attributes may be, for example, but not limited to a height of the object, a width of the object, and a length of the object.

Further, the first electronic device (100a) is configured to determine a structural component of the first object and a structural component of the second object. The structural component is any part of a framework of the first object or the second object. In other words, the structural component may be a base skeleton which is determined by including different required dimensions of the first object or the second object. It will have multiple dimensions for the first object or the second object, otherwise the structural component may be represented using one dimensional (1D) line model. Further, the first electronic device (100a) may be configured to map an intersection point of the structural component of the first object with the structural component of the second object by modifying a size of the first object and the second object. Further, the first electronic device (100a) may be configured to predict the plurality of attributes of visible portion of the first object and the second object based on the intersection point.

Further, the first electronic device (100a) may be configured to acquire depth information associated with the first object and the second object. The depth information associated with the first object may be determined from a position of the first electronic device (100a) and the depth information associated with the second object is determined from a position of the second electronic device (100b). Consider, in an example, the D1 is a depth of first point on the first object from the smart phone and D2 is a depth of a last point of the first object from the smart phone then D2-D1 is the length of the first object in a plane. Thus, the length measured is independent of how far the object is placed from the smart phone, and will remain same every time it is measured through the sensor (e.g., depth sensor).

Further, the first electronic device (100a) may be configured to provide the plurality of predicted dimensions of the visible portion the first object and the second object and the acquired depth information associated with the first object and the second object as input to a TOF sensor to generate the partial virtual model of the first object and the second object.

The first electronic device (100a) may be configured to receive the environmental observations tracked in the video session. Further, the first electronic device (100a) is configured to generate a sub-partial virtual model of the first object based on the plurality of predicted dimensions of the portion of the first object and the environmental observations tracked in the video session. Further, the first electronic device (100a) is configured to generate a sub-partial virtual model of the second object based on the plurality of predicted dimensions of the portion of the second object and the environmental observations tracked in the video session. Further, the first electronic device (100a) may be configured to generate the partial virtual model by mapping the sub-partial virtual model of the first object with the sub-partial virtual model of the second object using the TOF sensor.

In another embodiment, the sub-partial virtual model of the first object may be generated by determining dimension of not visible part of the first object and applying a machine learning model on the plurality of predicted dimensions of the visible portion of the first object and the dimension of the not visible portion of the first object to generate the sub-partial virtual model of the first object.

In another embodiment, the dimension of not visible part of the first object may be determined by virtually creating axis of similarity for portions of the first object, fetching a dimension of not visible part of the first object by virtually creating axis of similarity for portions of the first object, and determining the dimension of not visible part of the first object based on the fetched dimension of the not visible part of the first object.

The sub-partial virtual model of the second object may be generated by determining dimension of not visible part of the second object, and applying the machine learning model on the plurality of predicted dimensions of the visible portion of the second object and the dimension of the not visible portion of the second object to generate the sub-partial virtual model of the second object.

The dimension of not visible part of the second object may be determined by virtually creating axis of similarity for portions of the second object, fetching a dimension of not visible part of the second object by virtually creating axis of similarity for portions of the second object, and determining the dimension of not visible part of the second object based on the fetched dimension of not visible part of the second object.

Figure 2A:
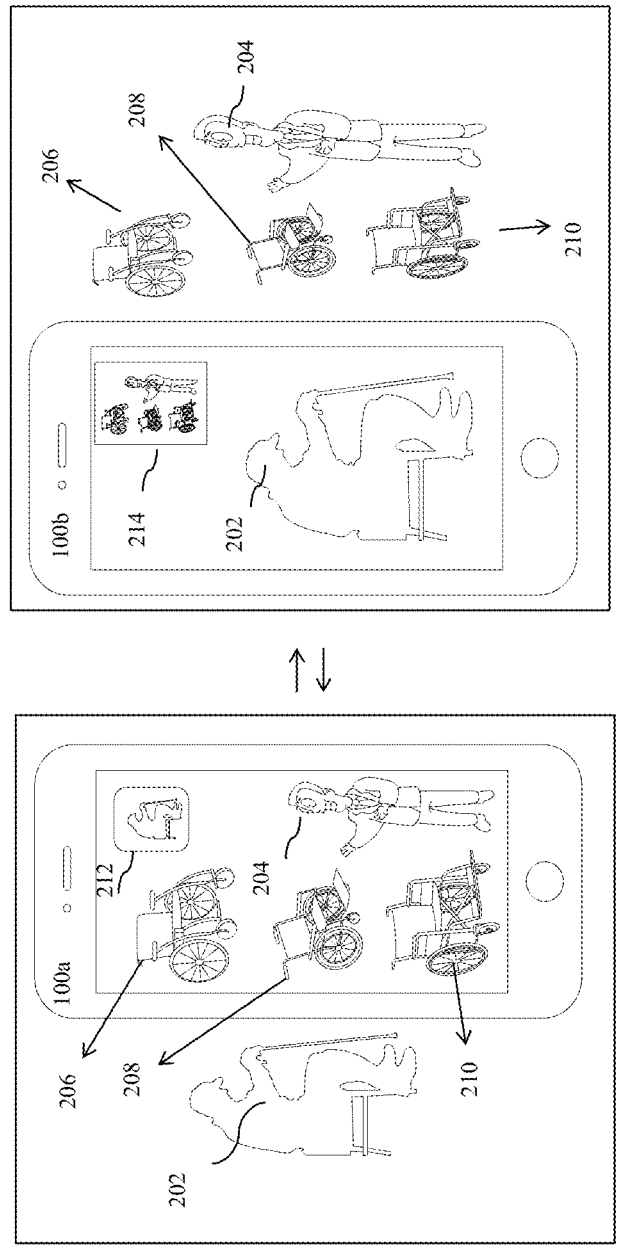

Referring to FIG. 2A, the user (202) of the first electronic device (100a) is calling to a store owner (204) of the second electronic device (100b) to buy a wheelchair (206-210). After receiving the call, the store owner (204) of the second electronic device (100b) is asking some details to the user (202) of the first electronic device (100a). The details may be, for example, but not limited to what is your condition? What size are you? What type do you want? or health condition.

Referring to FIG. 2A, an environment observer service is running in the first electronic device (100a) and the second electronic device (100b). The environment observer service triggers a TOF interaction controller (explained in FIG. 5B) of the first electronic device (100a) to receive various types of the wheelchair (206-210) displayed in the preview frame (212) of the first electronic device (100a) and the position of the user (202) displayed in the second preview frame (214) of the second electronic device (100b).

In another example, the environment observer service triggers the TOF interaction controller of the first electronic device (100a) to receive various types of the wheelchair displayed in the preview frame (212) of the first electronic device (100a) and acquires the position of the user from a memory stored as the image.

Figure 2B:
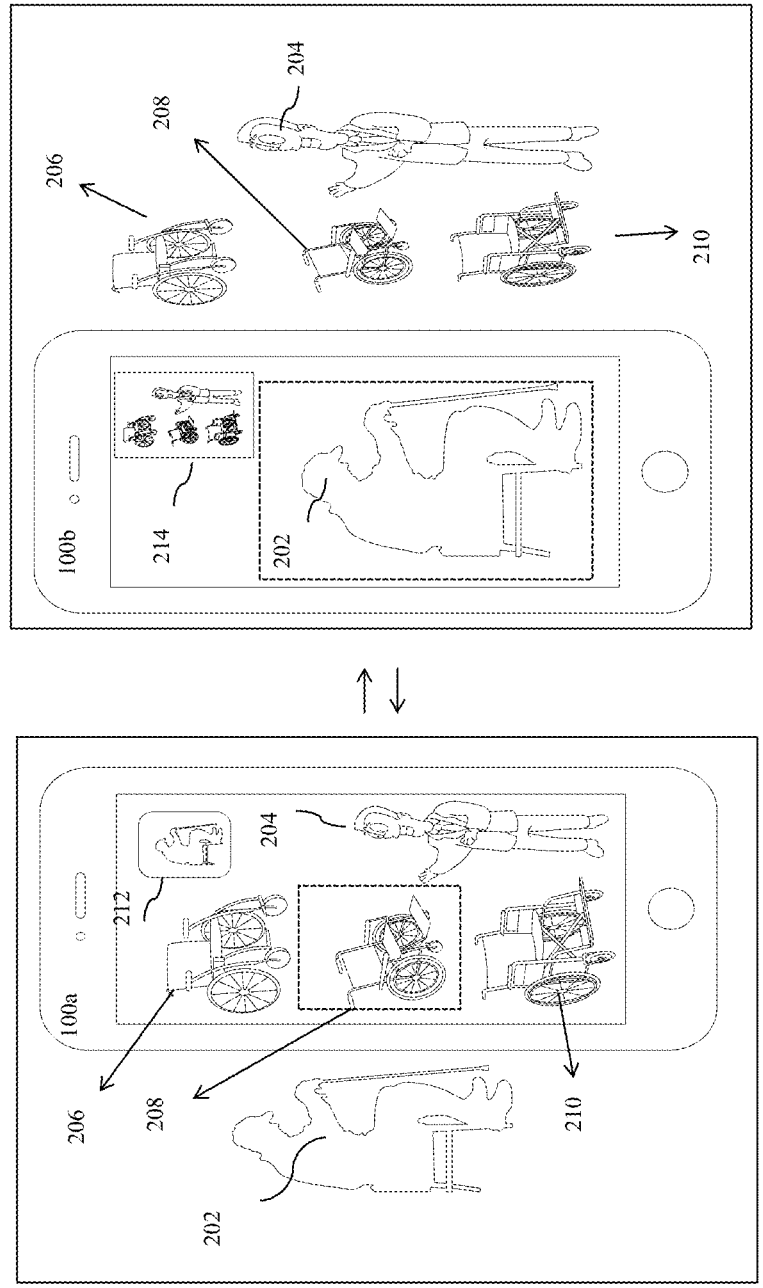
Figure 2D:
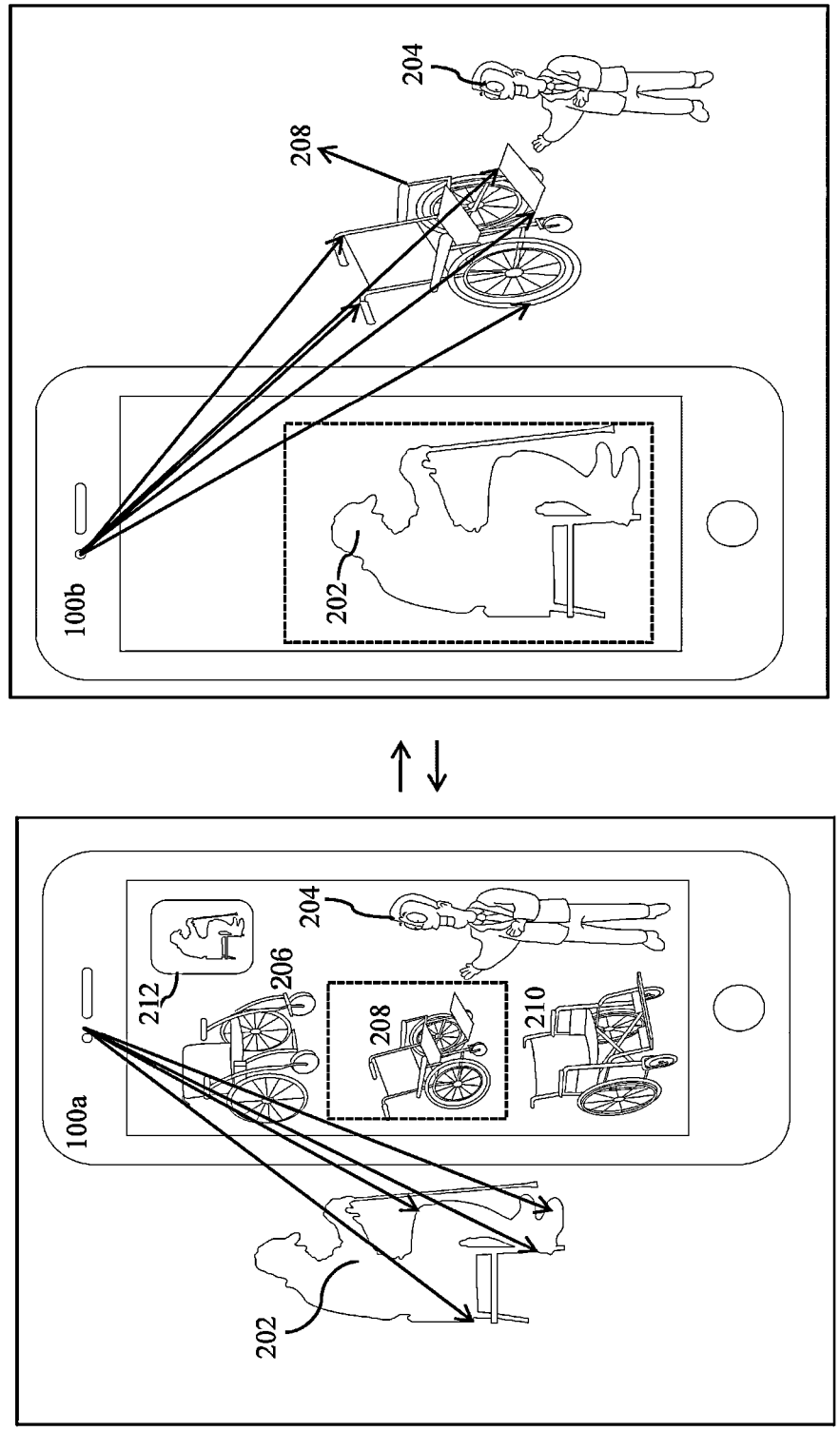

Referring to FIG. 2B, the TOF interaction controller may be configured to start interaction between various TOF sensor involved in the first electronic device (100a) and the second electronic device (100b). Further, the TOF interaction controller may be configured to intelligently sense which wheelchair (208) and the user (202) are required to be mapped across the TOF sensors.

Referring to FIG. 2C, an object sub-unit mapping controller (explained in FIG. 5B) in the first electronic device (100a) intelligently handles various object mapping across frames of the video call to map the various parts (216e, 216f, 216g, and 216h) of the wheelchair and the various parts (216a, 216b, 216c and 216d) of the user such as one to one, one to many or many to many in the frame. The various parts of the wheelchair may be, for example, but not limited to a user sitting part, a rest, an arm rest. The various parts of the users may be, for example, but not limited to legs, arms, Referring to FIG. 2D, an object mapping controller (explained in FIG. 5B) of the first electronic device (100a) verifies the dimensional suitability of the wheelchair and the user predicted to be mapped with each other along with which dimensions are required.

Figure 2E:
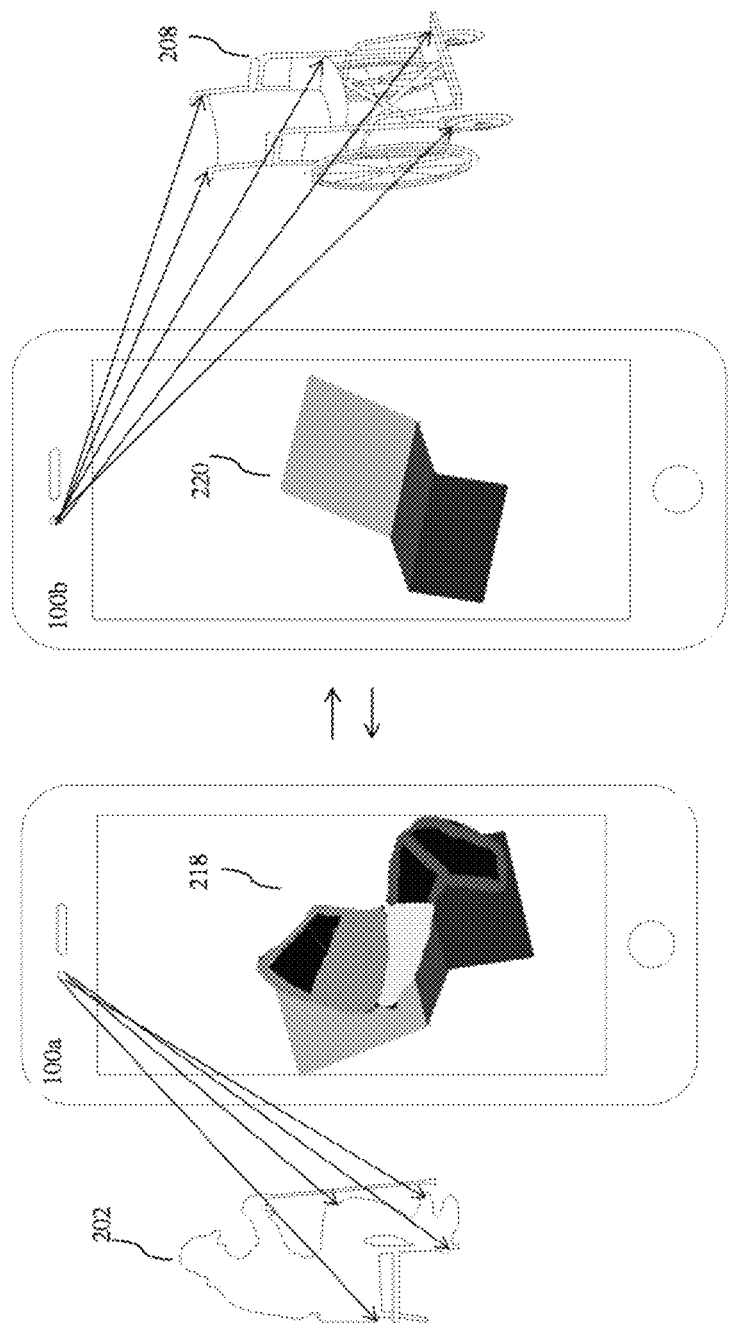
Figure 2F:
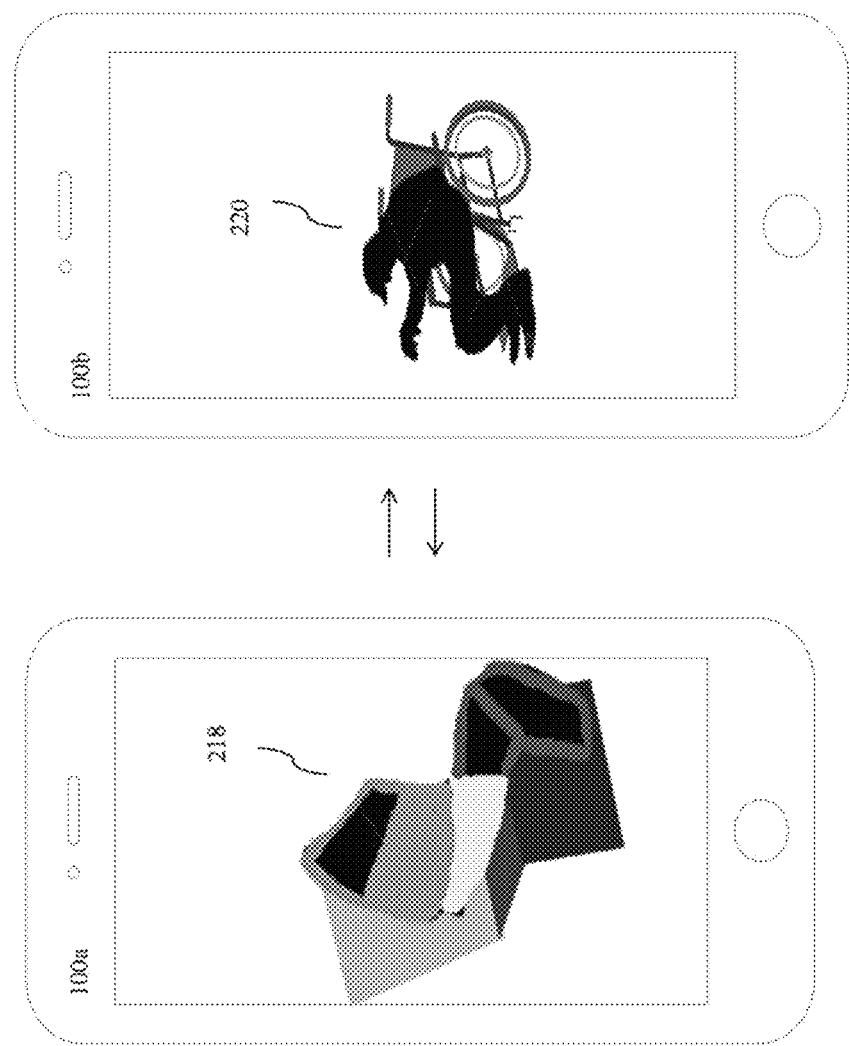

Referring to FIG. 2E, the first electronic device (100a) intelligently creates the partial 3D model (218 and 220) of only those dimensions which are required to map. It also includes the predicted hidden measurements which are not visible. The partial 3D models saves us CPU processing cycles, hardware usage, battery usage or the like Referring to FIG. 2F, the first electronic device (100a) virtually places the predicted objects onto each other in a suitable position and shares the intelligent display to the user (202) of the first electronic device (100a).

FIG. 3 is an example scenario in which identifying points of the structural intersection is depicted, according to an embodiment of the disclosure.

Referring to FIG. 3, the object mapping controller works on the basis of placing the object predicted to be mapped on each on the basis of usage of the object and then strategically change various dimensions of one of the objects to detect a hindrance of their structural unit. This defining those dimensions as the one required to map the objects. Panel "a" of FIG. 3 depicts a structural mapping of the object (302) and panel "b" of FIG. 3 depicts a basic human sitting structure (304). Panel "c" of FIG. 3 depicts that gradually changing the size of each part of any object and the basic human sitting structure (306) in which structural lines of the basic human sitting structure (306) intersects with structural lines of objects to identify points (308, 310, 312 and 314) of structural intersection as shown in panel "d" of FIG. 3.

In other words, the first electronic device (100a) may obtain a basic structure of each object and place both object structure onto each other. Further, the first electronic device (100a) may keep any one structure constant and increase/decrease the size of other structure gradually in all direction till the structures starts getting intersected, such that intersected points are the dimensions required for the mapping of both the objects.

In the proposed methods, by using the required 3D model of the second object, the first electronic device (100a) may only capture the dimensions which is required for the second object mapping. Referring to FIG. 3, the first electronic device (100a) only captures the back portion of the user, a hip portion of the user, and a leg portion of the user are used here. Further, the partial 3D model may be created using only the visible sides and using predicted hidden sides dimensions of the object. This resulting less usage of resources.

Figure 4:
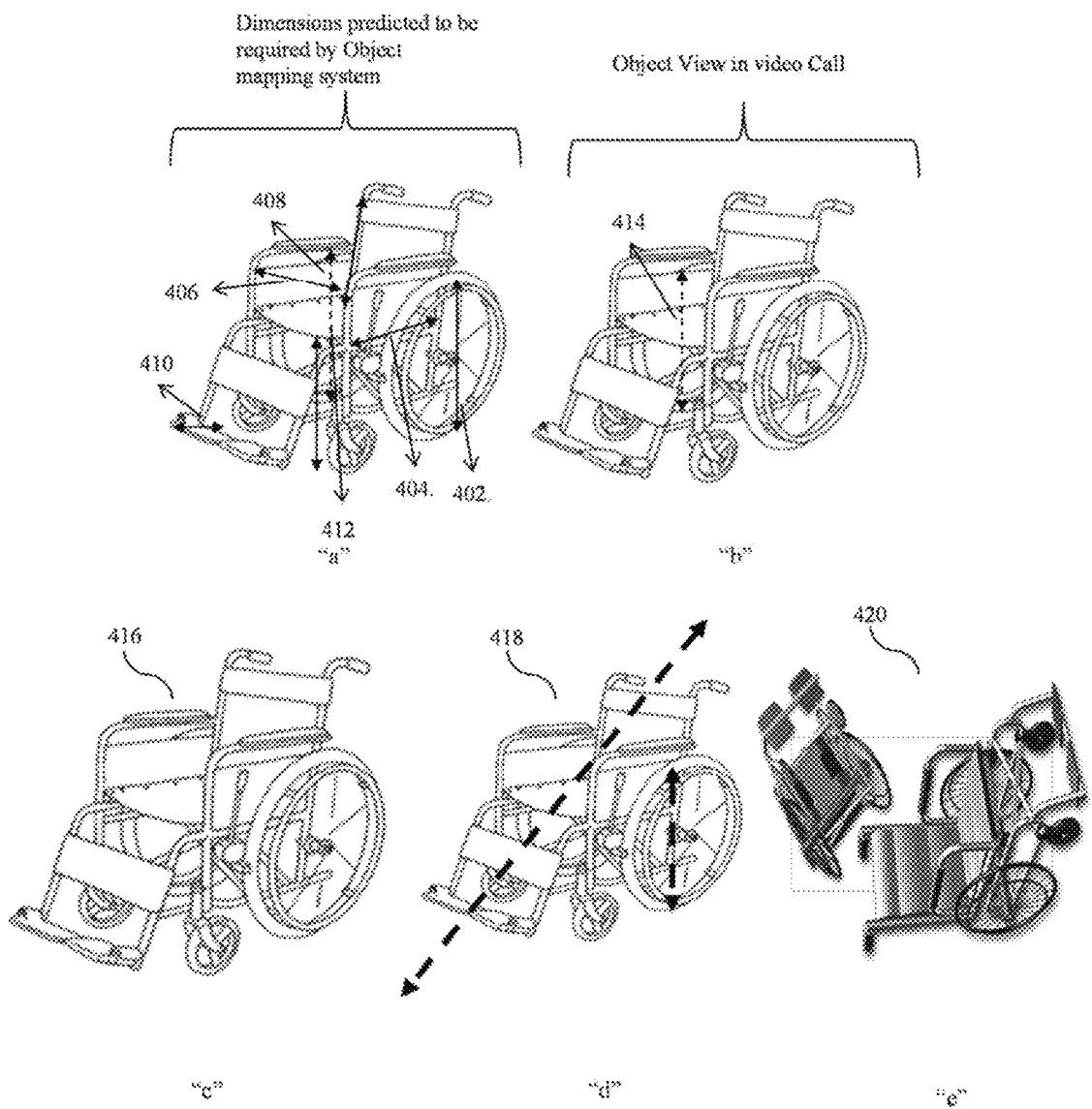
FIG. 4 is an example scenario in which determining attributes of not visible part of an object is depicted for generating a partial virtual model of the object, according to an embodiment of the disclosure.

FIG. 4 is an example scenario in which determining attributes of not visible part of an object is depicted for generating a partial virtual model of the object, according to an embodiment of the disclosure.

Referring to FIG. 4, Panel "a" of FIG. 4 depicts the dimensions (402, 404, 406, 408, 410, and 412) predicted to be required by the object mapping controller and the object view in the video call is depicted with the dimension (414) as shown in panel "b" of FIG. 4.

Panel "c-e" of FIG. 4, the first electronic device (100a) virtually creates axis of similarity for portions of the first object (416) on the basis of what percent of data shown in the frame are similar across both sides of the axis. Further, the first electronic device (100a) may fetch a dimension of the not visible part of the second object by virtually creating axis of similarity for portions of the second object (418). Further, the first electronic device (100a) may determine the dimension of the not visible part of the second object based on the fetched dimension of the not visible part of the second object, such that the the first electronic device (100a) may generate the partial virtual model (420) of the object.

Figure 5A:
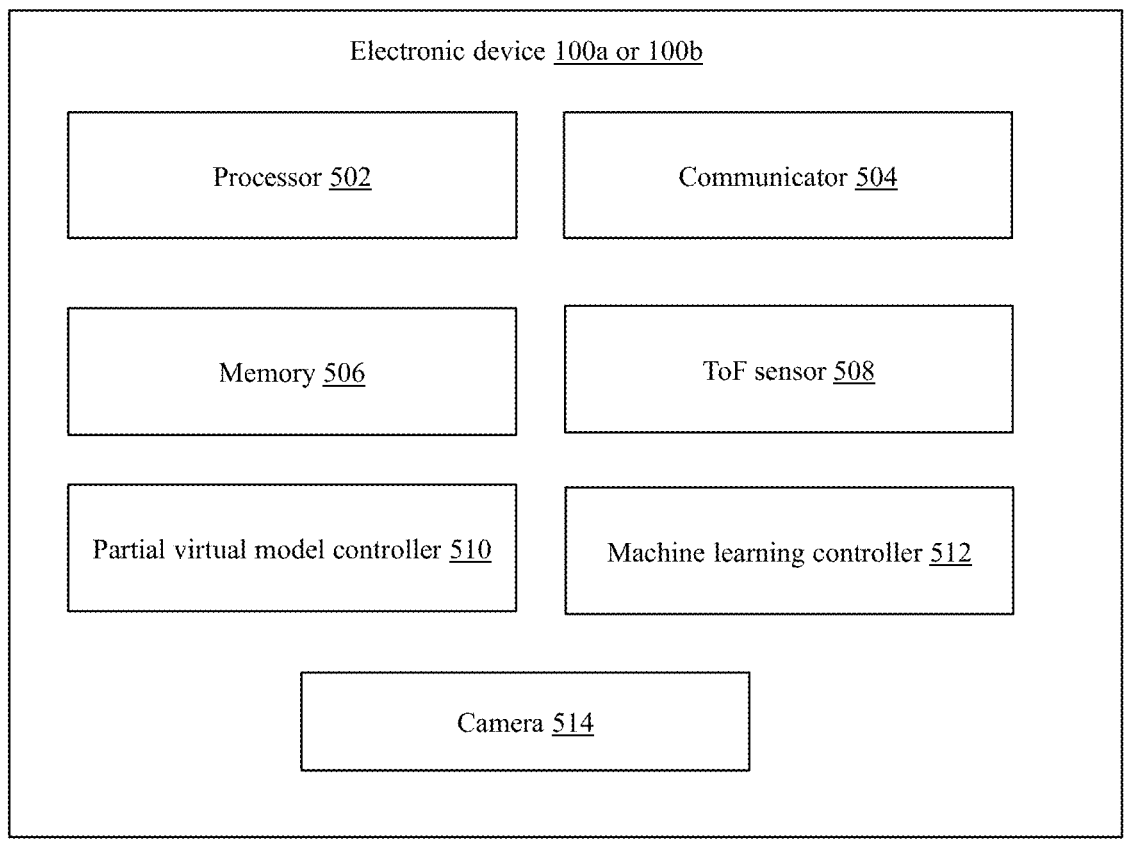
FIG. 5A illustrates various hardware components of a first electronic device or a second electronic device, according to an embodiment of the disclosure.

FIG. 5A shows various hardware components of a first electronic device or a second electronic device, according to an embodiment of the disclosure.

Referring to FIG. 5A, the first electronic device (100a) or the second electronic device (100b) may include a processor (502), a communicator (504), a memory (506), a sensor (508), a partial virtual model controller (510), a machine learning controller (512), and a camera (514). The sensor (508) may be, for example, but not limited to a TOF sensor and a depth sensor.

The processor (502) may be coupled with the communicator (504), the memory (506), the sensor (508), the partial virtual model controller (510), the machine learning controller (512), and the camera (514).

In an embodiment, the partial virtual model controller (510) may be configured to detect that the first electronic device (100a) is in the video session with second electronic device (100b).

Based on detecting the video session, the sensor (508) triggers the environment observer service running in the first electronic device (100a) and the second electronic device (100b). The environment observer service processes various data factors such conversational data, facial expression or the like.

The sensor (508) may be configured to receive the first set of objects displayed in preview frame of the first electronic device (100a) and the second set of objects displayed in the second preview frame of the second electronic device (100b).

Further, the partial virtual model controller (510) may be configured to start interaction between various sensors (508) involved in the first electronic device (100a) and the second electronic device (100b). Further, the partial virtual model controller (510) may be configured to intelligently sense which objects are required to be mapped across the sensor (508) of the first electronic device (100a) and the second electronic device (100b).

Further, the partial virtual model controller (510) in the first electronic device (100a) intelligently handles various object mapping across frames of the video session to map objects such as one to one, one to many or many to many in a video frame. The partial virtual model controller (510) may verify the dimensional suitability of the objects predicted to be mapped with each other along with which dimensions are required. Further, the partial virtual model controller (510) may intelligently create the partial 3D model of only those dimensions which are required to map. The partial 3D model may also include the predicted hidden measurements which are not visible. The partial virtual model controller (510) may virtually place the predicted objects onto each other in a suitable position and shares the intelligent display to the user of the first/second electronic device (100a or 100b).

Further, the partial virtual model controller (510) may assume the dimension of those portions of the object that are not shown in any frame of the video but are predicted to be important for mapping of 2 objects. The machine learning controller (512) may train the machine learning model includes variable parameter such as user's expression across the first and second electronic devices (100a and 100b), conversation snippets, etc., to predict the best result of the interaction.

The processor (502) may be configured to execute instructions stored in the memory (506) and to perform various processes. The communicator (504) may be configured for communicating internally between internal hardware components and with external devices via one or more networks.

The memory (506) may also store instructions to be executed by the processor (502). The memory (506) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (506) may, in some examples, be considered a non-transitory storage medium. The term "non-transitory" may indicate that the storage medium is not embodied in a carrier wave or a propagated signal. However, the term "non-transitory" should not be interpreted that the memory (506) is non-movable. In some examples, the memory (506) may be configured to store larger amounts of information than the memory. In certain examples, a non-transitory storage medium may store data that may, over time, change (e.g., in Random Access Memory (RAM) or cache).

Further, at least one of a plurality of hardware components may be implemented through an artificial intelligent (AI) model. A function associated with AI may be performed through the non-volatile memory, the volatile memory, and the processor (502). The processor (502) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors may control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (e.g., a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 5A shows various hardware components of the first electronic device (100a) or the second electronic device (100b) but it is to be understood that other embodiments are not limited thereon. In other embodiments, the first electronic device (100a) or the second electronic device (100b) may include less or more number of components. Further, the labels or names of the components are used only for illustrative purpose and does not limit the scope of the disclosure. One or more components may be combined together to perform same or substantially similar function to generate the partial virtual model of objects.

Figure 5B:
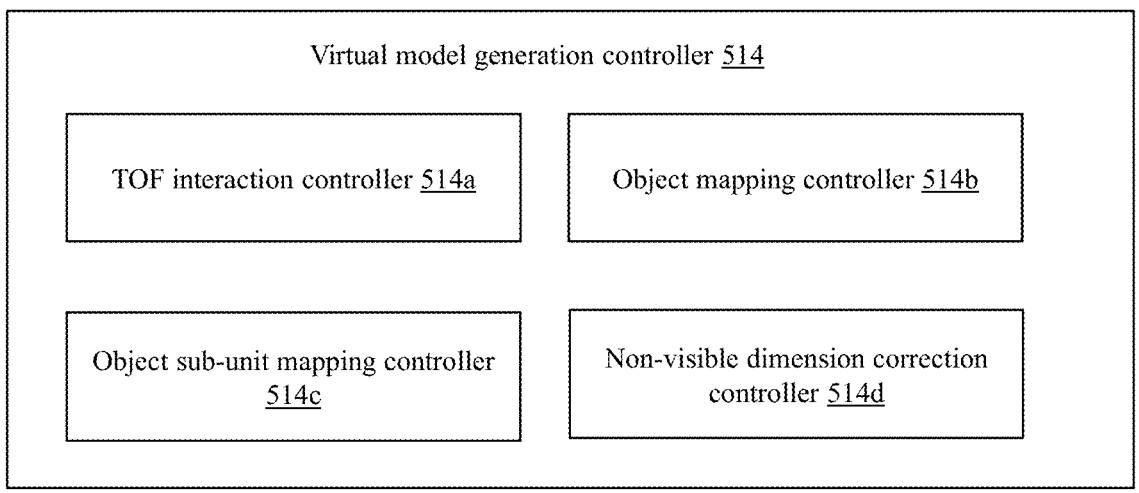
FIG. 5B illustrates various hardware components of a virtual model generation controller included in a first electronic device or a second electronic device, according to an embodiment of the disclosure.

FIG. 5B shows various hardware components of a partial virtual model controller, according to an embodiment of the disclosure.

Referring to FIG. 5B, the partial virtual model controller (510) may include a TOF interaction controller (514a), an object mapping controller (514b), an object sub-unit mapping controller (514c), and a non-visible dimension correction controller (514d).

The TOF interaction controller (514a) may be configured to receive the first set of objects displayed in the preview frame of the first electronic device (100a) and the second set of objects displayed in the second preview frame of the second electronic device (100b). Further, the TOF interaction controller (514a) may be configured to start interaction between various sensors (508) involved in the first electronic device (100a) and the second electronic device (100b). Further, the TOF interaction controller (514a) may be configured to intelligently sense which objects are required to be mapped across the sensors (508) of the first electronic device (100a) and the second electronic device (100b).

Further, the object sub-unit mapping controller (514c) may intelligently handle various object mapping across frames of the video session to map objects in the video frame. The object mapping controller (514b) may verify the dimensional suitability of the objects predicted to be mapped with each other along with which dimensions are required. Further, the partial virtual model controller (510) may intelligently create the partial 3D model of only those dimensions which are required to map. The partial 3D model may also include the predicted hidden measurements which are not visible. The partial virtual model controller (510) may virtually place the predicted objects onto each other in a suitable position and shares the intelligent display to the user of the first electronic device (100a).

Further, the non-visible dimension correction controller (514d) may assume the dimension of those portions of the object that are not shown in any frame of the video but are predicted to be important for mapping of two objects.

Figure 6A:
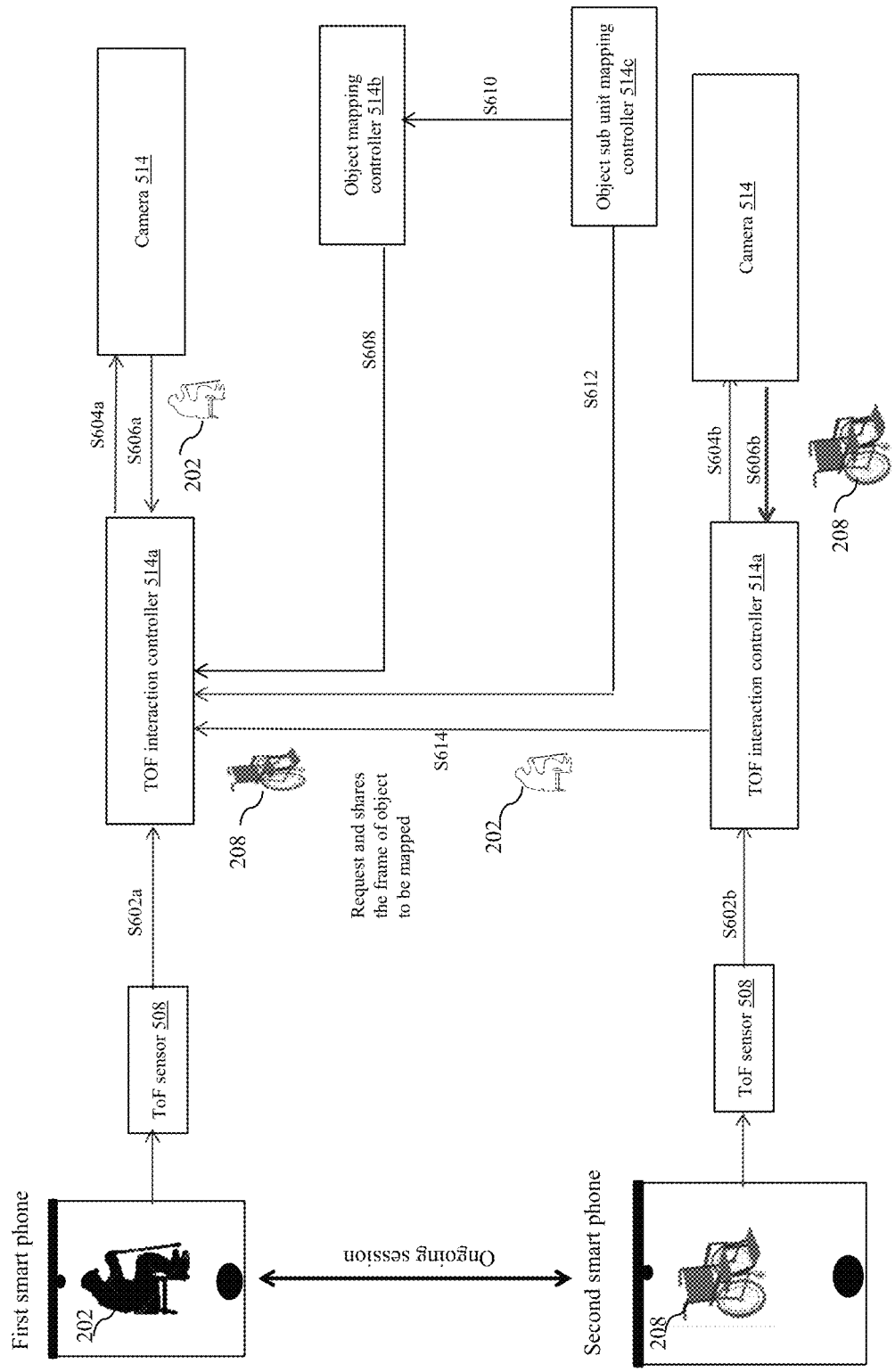
FIGS. 6A and 6B are example sequence flow diagrams illustrating step by step process for generating a partial virtual model of the objects, according to various embodiments of the disclosure.
Figure 6B:
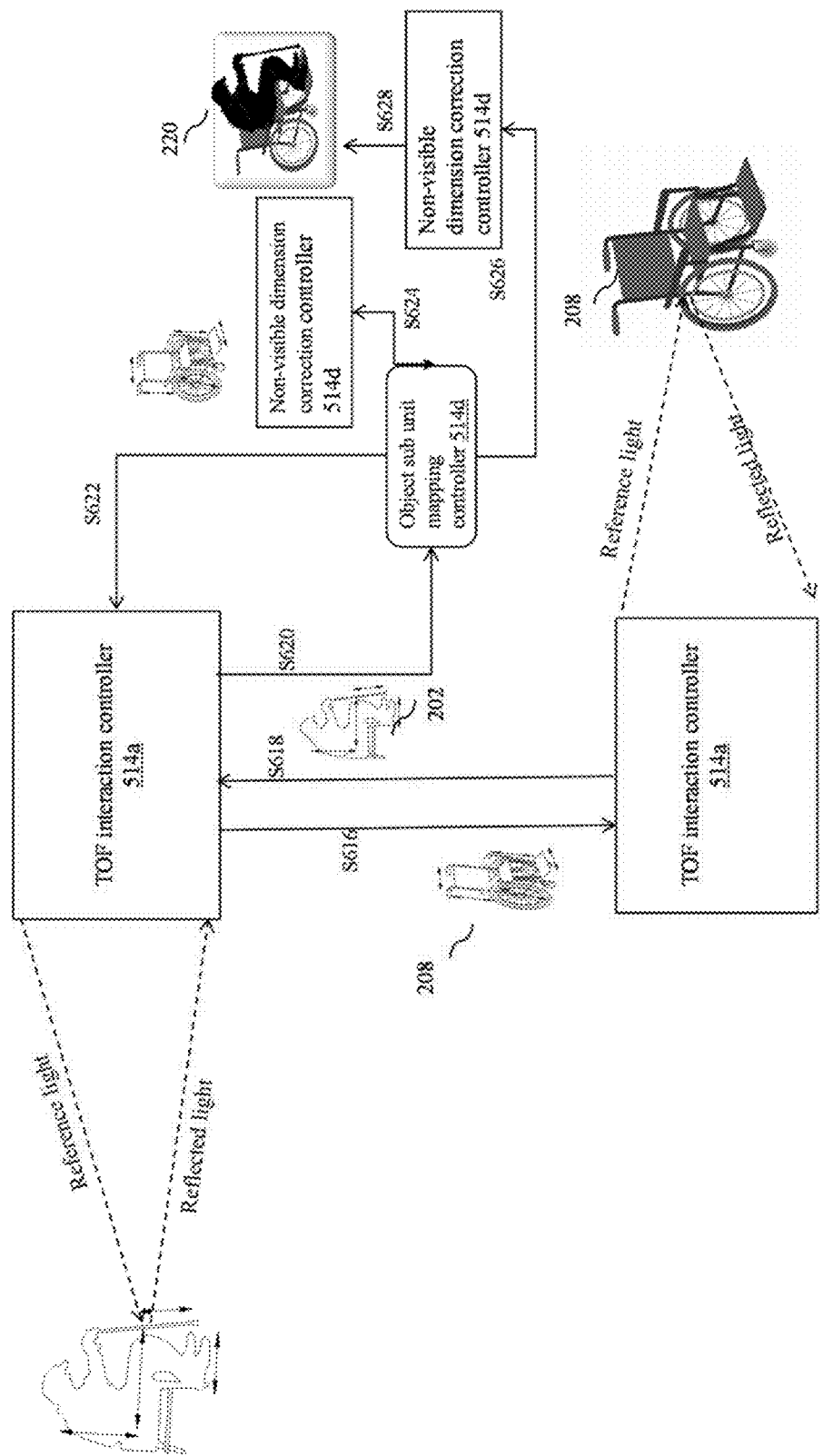

FIGS. 6A and 6B are example sequence diagram illustrating step by step process for generating the partial virtual model of objects, according to various embodiments of the disclosure.

Referring to FIGS. 6A and 6B, at S602a and S602b, the TOF interaction controller (514a) may start interaction between various sensors (508) involved in the first smart phone and the second smart phone. At S604a and S604b, the TOF interaction controller (514a) may send a request for obtaining the frame from the camera (514) of the first smart phone and the second smart phone, respectively. At, S606a and S606b, the TOF interaction controller (514a) may receive the first set of objects displayed in the preview frame of the first smart phone and the second set of objects displayed in the second preview frame of the second smart phone, respectively.

At S608, the object mapping controller (514b) may verify the dimensional suitability of the objects predicted to be mapped with each other along with which dimensions are required. At S610, the object sub-unit mapping controller (514c) intelligently handles various object mapping across frames of the video session to map objects in the video frame. At S612 and S614, the TOF interaction controller (514a) may be configured to intelligently sense which objects are required to be mapped across the sensors (508) of the first electronic device (100a) and the second electronic device (100b).

At S616, the TOF interaction controller (514a) of the second smart phone request the required dimension of the first object. At S618, the TOF interaction controller (514a) of the first smart phone shared the required dimension of the first object to the TOF interaction controller (514a) of the second smart phone based on the request. At S620, the TOF interaction controller (514a) of the first smart phone is configured send the dimension of the first object and the dimension of the second object to the object sub-unit mapping controller (514c). At S622, the object sub-unit mapping controller (514c) is configured to intelligently sense which objects are required to be mapped across the sensors (508) of the first electronic device (100a) and the second electronic device (100b).

At S624, the non-visible dimension correction controller (514d) may assume the dimension of those portions of the object that are not shown in any frame of the video but are predicted to be important for mapping of two objects.

At S626, the partial virtual model controller (510) may intelligently create the partial 3D model of only those dimensions which are required to map. The partial 3D model may also include the predicted hidden measurements which are not visible. At S628, the partial virtual model controller (510) may virtually place the predicted objects onto each other in a suitable position and shares the intelligent display to the user of the first electronic device (100a).

Figure 7B:
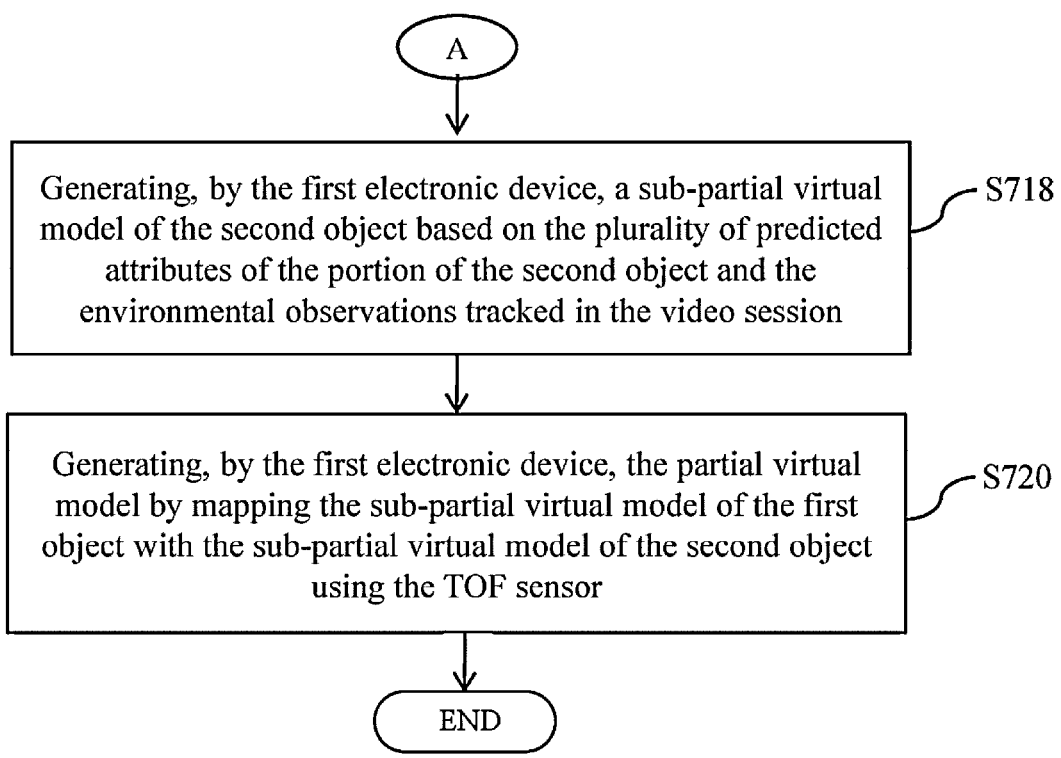

FIGS. 7A and 7B are an example flow chart illustrating a method for generating a partial virtual model of objects, according to an embodiment of the disclosure.

Referring to FIGS. 7A and 7B, in a method S700, the operations S702-S718 are performed by the partial virtual model controller (510). At S702, the method may include detecting that the first electronic device (100a) is in the video session with the second electronic device (100b). At S704, the method may include receiving the first set of objects displayed in preview frame of the first electronic device (100a) and the second set of objects displayed in second preview frame of the second electronic device (100b). At S706, the method may include determining the first object from the first set of objects to be mapped to the second object from the second set of objects based on the environmental observations in the video session.

At S708, the method may include predicting the plurality of attributes of the visible portion of the first object and the second object by mapping the first object with the second object. At S710, the method may include acquiring the depth information associated with the first object and the second object. At S712, the method may include providing the plurality of predicted dimensions of the visible portion the first object and the second object as input to the TOF sensor (508) to generate the partial virtual model of the first object and the second object.

At S714, the method may include receiving the environmental observations tracked in the video session. At S716, the method may include generating the sub-partial virtual model of the first object based on the plurality of predicted attributes of the portion of the first object and the environmental observations tracked in the video session. At S718, the method may include generating the sub-partial virtual model of the second object based on the plurality of predicted attributes of the portion of the second object and the environmental observations tracked in the video session. At S720, the method may include generating the partial virtual model by mapping the sub-partial virtual model of the first object with the sub-partial virtual model of the second object using the sensor.

Figure 7C:
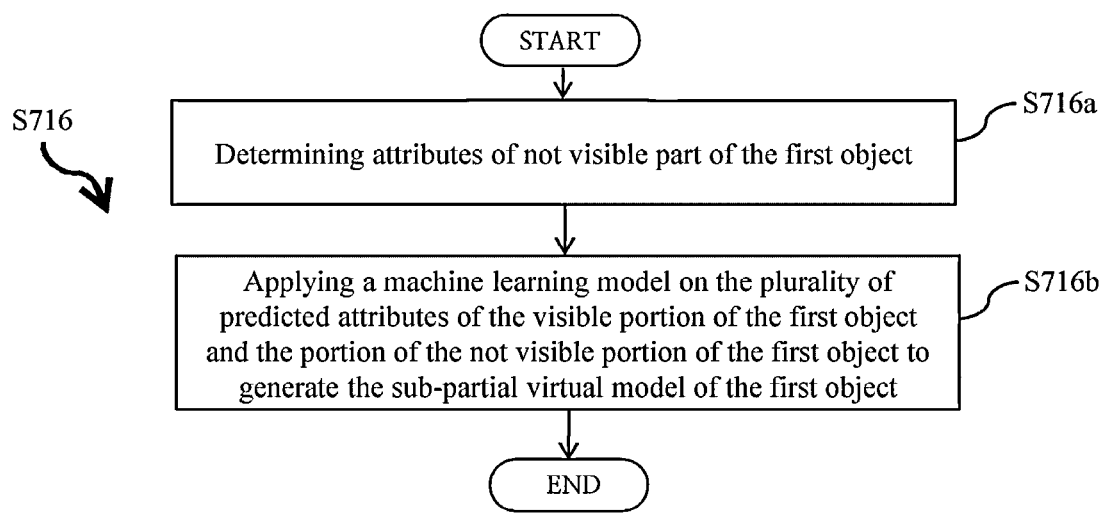
FIG. 7C is a flow diagram illustrating various operations for generating a sub-partial virtual model of a first object based on a plurality of predicted attributes of a portion of a first object and environmental observations tracked in the video session, according to an embodiment of the disclosure.

FIG. 7C is a flow diagram illustrating various operations for generating a sub-partial virtual model of a first object based on a plurality of predicted attributes of a portion of the first object and an environmental observations tracked in a video session, according to an embodiment of the disclosure.

Referring to 7C, in operation S716, at 716a, the method may include determining the attributes of the not visible part of the first object. At 716b, the method may include applying the machine learning model on the plurality of predicted attributes of the visible portion of the first object and the portion of the not visible portion of the first object to generate the sub-partial virtual model of the first object.

Figure 7D:
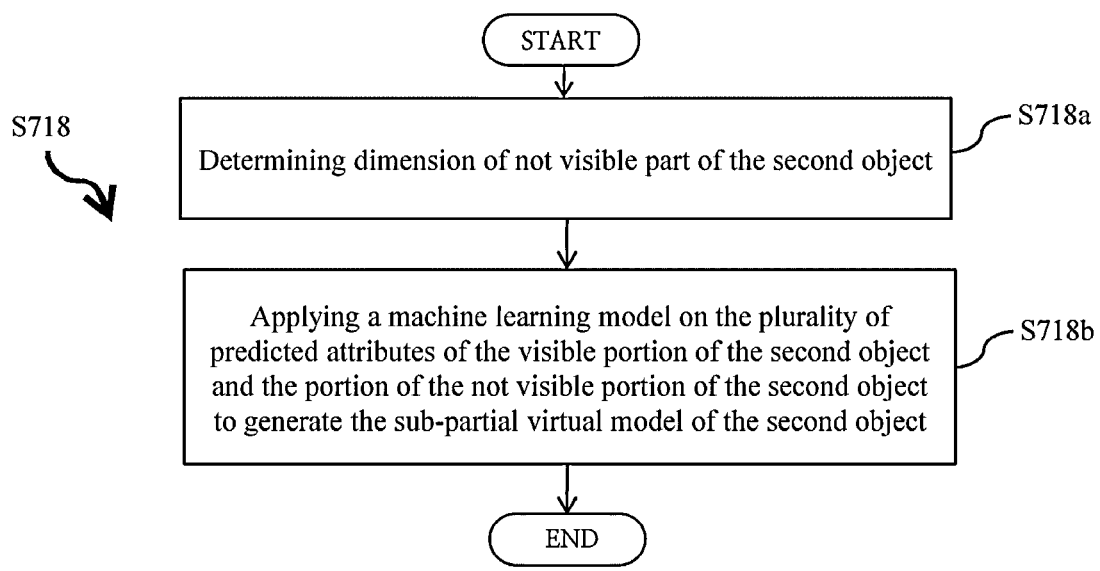
FIG. 7D is a flow diagram illustrating various operations for generating a sub-partial virtual model of a second object based on a plurality of predicted attributes of a portion of the second object and the environmental observations tracked in the video session, according to an embodiment of the disclosure.

FIG. 7D is a flow diagram illustrating various operations for generating the sub-partial virtual model of the second object based on the plurality of predicted attributes of the portion of the second object and the environmental observations tracked in the video session, according to an embodiment of the disclosure.

Referring to FIG. 7D, in operation S718, at 718a, the method may include determining dimension of not visible part of the second object. At 718b, the method may include applying the machine learning model on the plurality of predicted attributes of the visible portion of the second object and the predicted attributes of the not visible portion of the second object to generate the sub-partial virtual model of the second object.

Figure 7E:
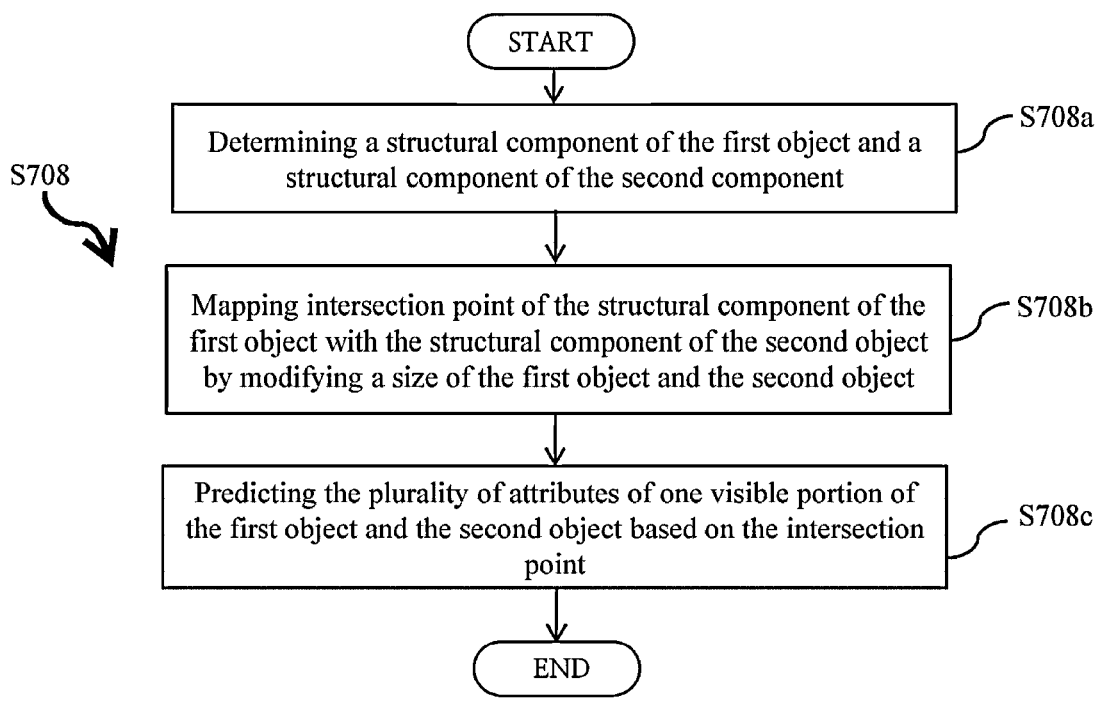
FIG. 7E is a flow diagram illustrating various operations for predicting a plurality of attributes of a visible portion of a first object and a second object by mapping the first object with the second object, according to an embodiment of the disclosure.

FIG. 7E is a flow diagram illustrating various operations for predicting the plurality of attributes of the visible portion of the first object and the second object by mapping the first object with the second object, according to an embodiment of the disclosure.

Referring to FIG. 7E, in operation S708, at 708a, the method may include determining the structural component of the first object and the structural component of the second component. At 708b, the method may include mapping the intersection point of the structural component of the first object with the structural component of the second object by modifying a size of the first object and the second object. At 708c, the method may include predicting the plurality of attributes of visible portion of the first object and the second object based on the intersection point.

Figure 7F:
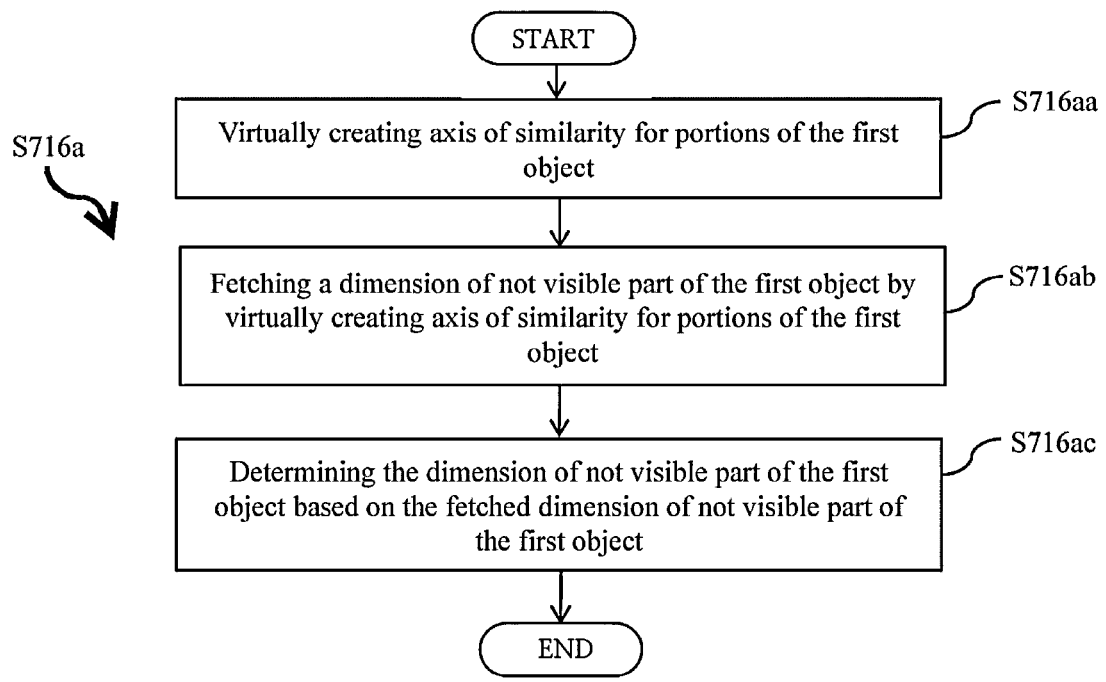
FIG. 7F is a flow diagram illustrating various operations for determining a dimension of not visible part of a first object, according to an embodiment of the disclosure.

FIG. 7F is a flow diagram illustrating various operations for determining the dimension of not visible part of the first object, according to an embodiment of the disclosure.

Referring to FIG. 7F, in operation S716a, at 716aa, the method may include virtually creating the axis of similarity for portions of the first object. At 716ab, the method may include fetching the dimension of not visible part of the first object by virtually creating axis of similarity for portions of the first object. At 716ac, the method may include determining the dimension of not visible part of the first object based on the fetched dimension of not visible part of the first object.

Figure 7G:
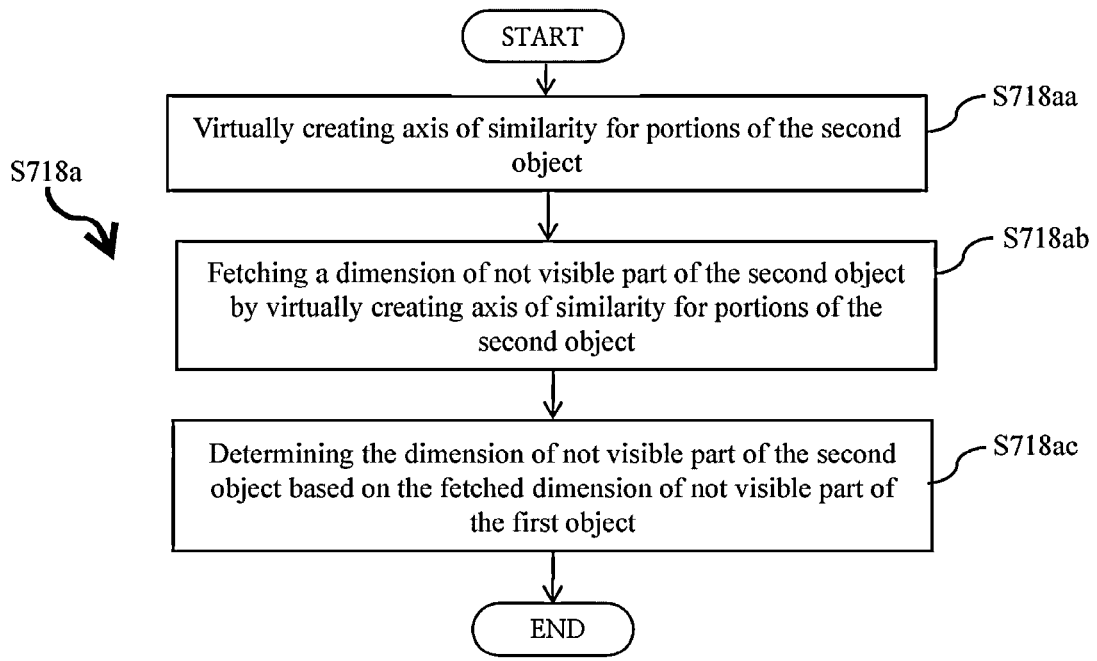
FIG. 7G is a flow diagram illustrating various operations for determining a dimension of not visible part of a second object, according to an embodiment of the disclosure.

FIG. 7G is a flow diagram illustrating various operations for determining the dimension of not visible part of the second object, according to an embodiment of the disclosure.

Referring to FIG. 7G, in operation S718a, at 718aa, the method may include virtually creating the axis of similarity for portions of the second object. At 718ab, the method may include fetching the dimension of the not visible part of the second object by virtually creating axis of similarity for portions of the second object. At 718ac, the method may include determining the dimension of the not visible part of the second object based on the fetched dimension of not visible part of the first object.

The various actions, acts, blocks, steps, or the like in the S700 (S708, S716, S716a, S718, and S718a) may be performed in the order presented, in a different order or simultaneously. Further, in some embodiments, some of the actions, acts, blocks, steps, or the like may be omitted, added, modified, skipped, or the like without departing from the scope of the disclosure.

FIG. 8A to FIG. 8E are example scenario in which a virtual assisted shopping using the TOF sensors is depicted, according to various embodiments of the disclosure.

Figure 8A:
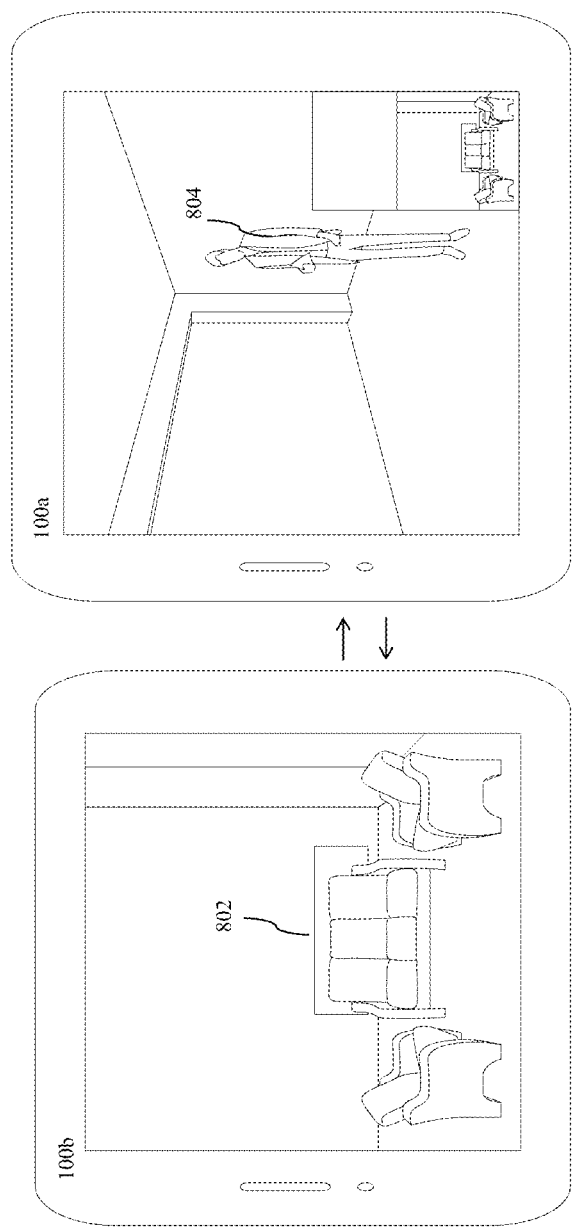
FIGS. 8A, 8B, 8C, 8D, and 8E are example scenario in which a virtual assisted shopping using TOF sensors is depicted, according to various embodiments of the disclosure.
Figure 8B:
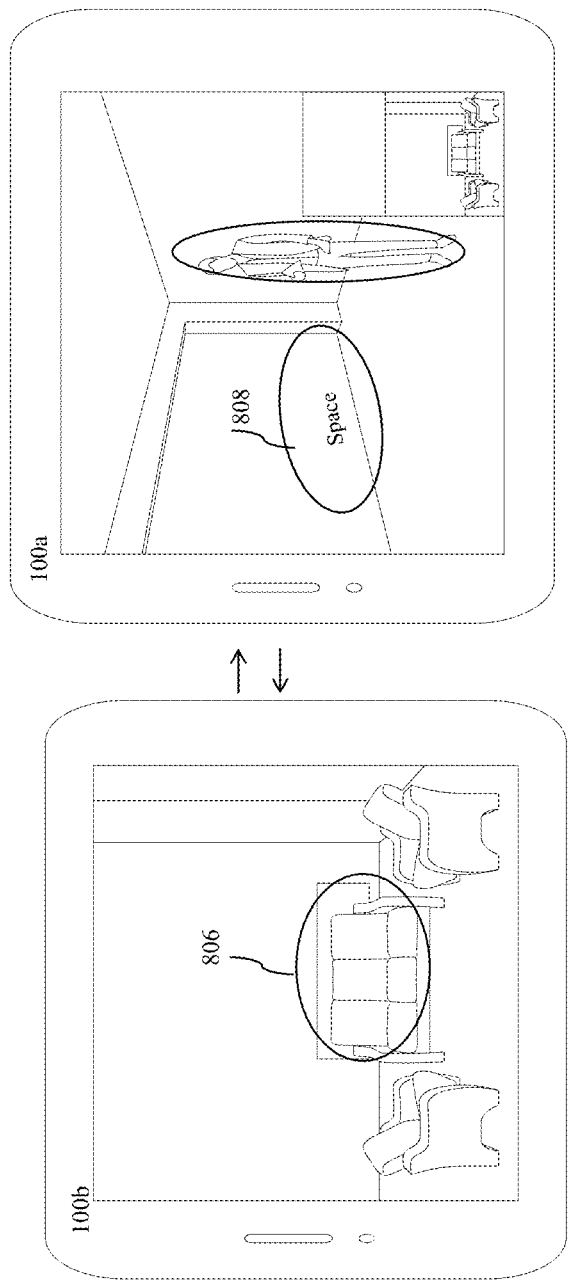
Figure 8C:
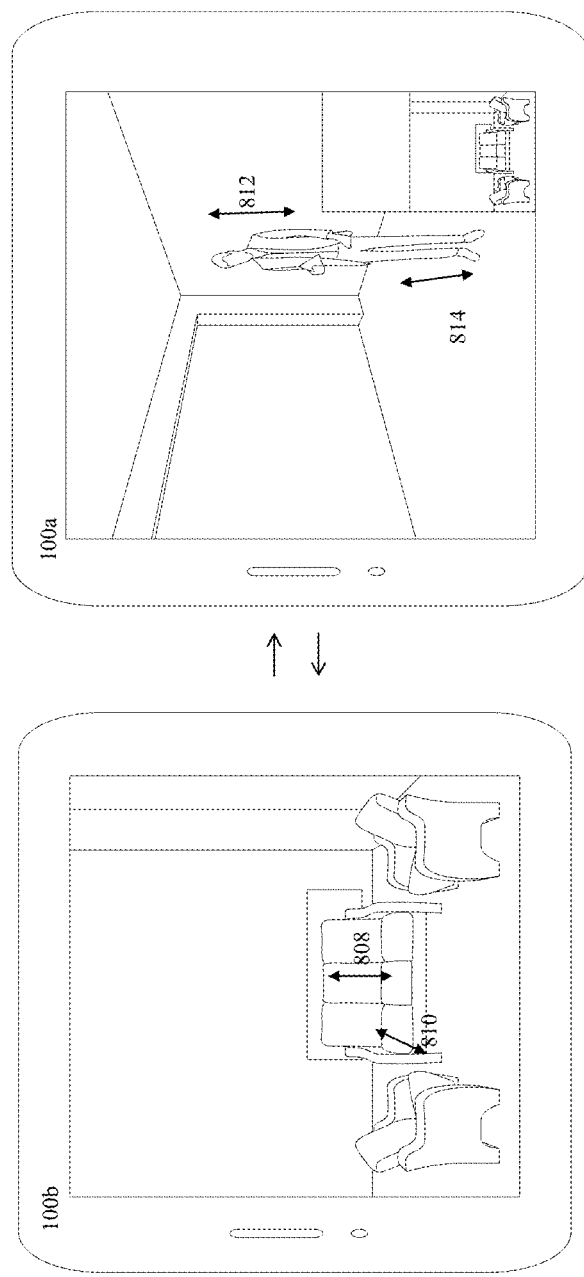
Figure 8D:
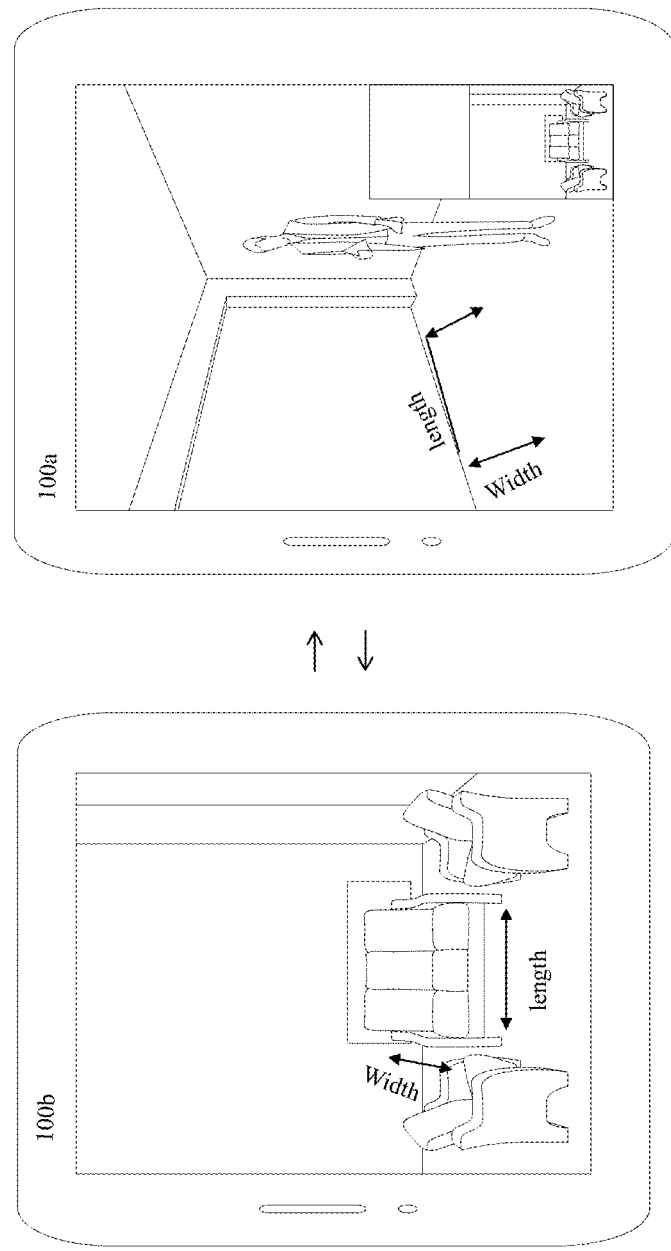
Figure 8E:
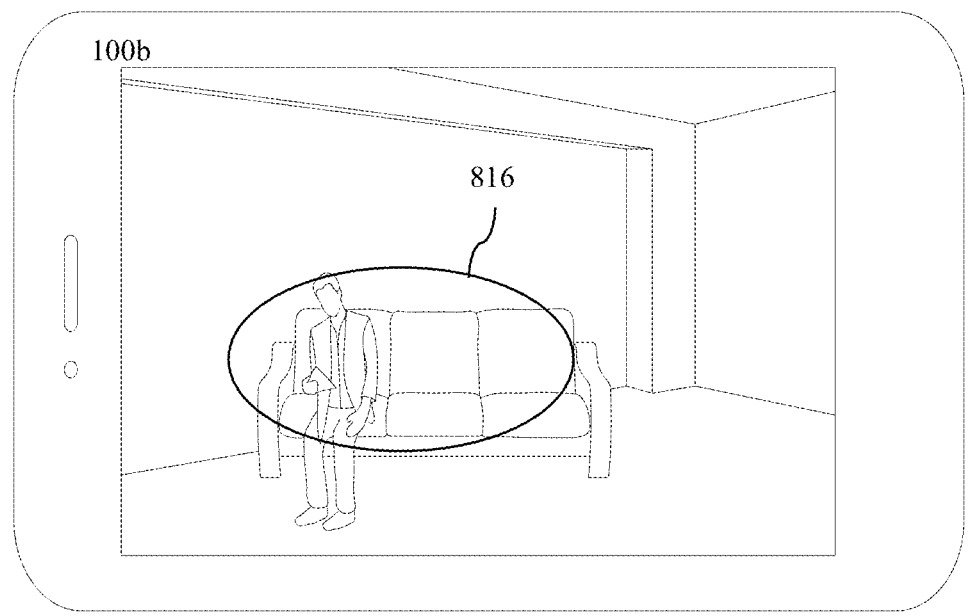

Referring to FIG. 8A, the user (804) of the first electronic device (100a) initiates the video call to a furniture shop and the user of the first electronic device (100a) requests to buy the sofa (806). The user of the first electronic device (100a) shows him/her a space (808) in the empty room where the user intends to put the sofa. Further, the shop owner shows the sofa (806) to the user (804) of the first electronic device (100a) and asks where does the user wants to place it. Referring to FIGS. 8B to 8D, on the basis of conversation over the video call, the first electronic device (100a) selects the objects (i.e., user and sofa and sofa and space in the living room) to be mapped and the requirement of dimensional intelligence is triggered automatically by the proposed method. The objects are selected automatically to be mapped dimensionally (808, 810, 812, and 814). In this case, multiple mapping is observed by the proposed method, 1) Sofa to Placement Location and 2) Sofa to User.

Intelligently few automatically deduced required dimensions (e.g., length, width, height) of the sofa is mapped with the required dimensions (e.g., length, width, height) of the location at which the user (802) wishes to place the sofa (806). Also for second mapping few other automatically deduced required dimensions of the sofa (806) is mapped with the required dimensions (e.g., height, width, or the like) of the user. Further, the partial virtual model controller (510) may take inputs from the TOF sensor in form of dimension data and the machine learning model output. It will map the best fit furniture (816) in the living room.

Figure 9A:
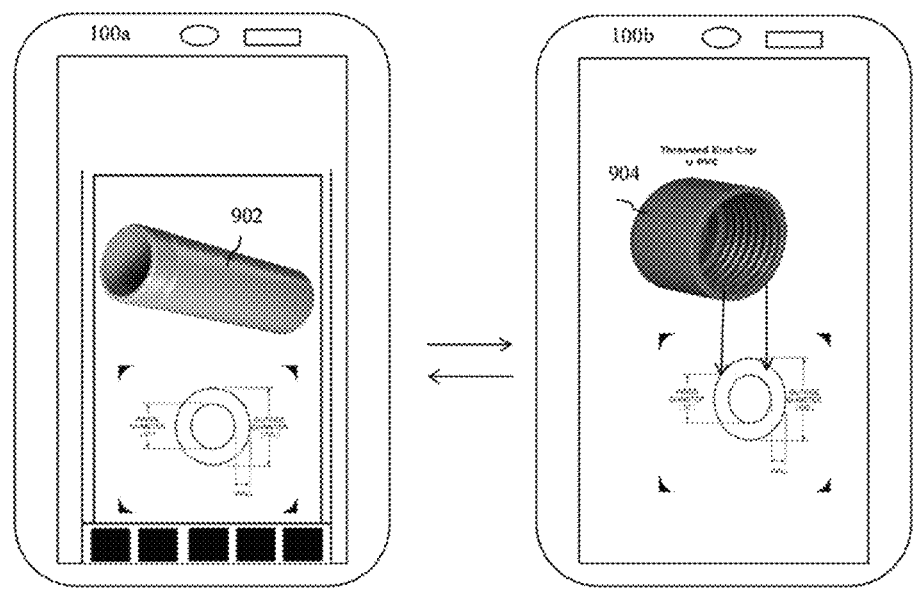
FIGS. 9A and 9B are example scenario in which an assisted fitting measurement using TOF sensors is depicted, according to various embodiments of the disclosure.
Figure 9B:
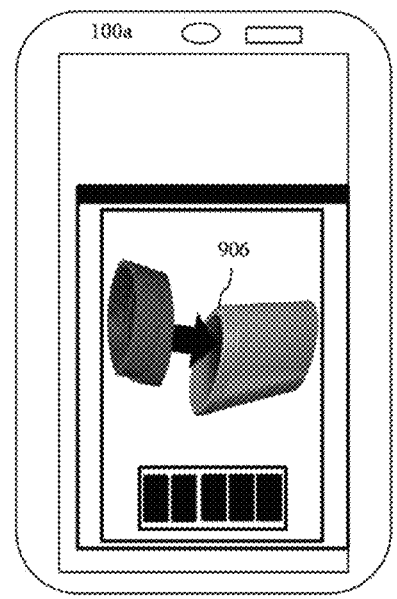

FIGS. 9A and 9B are example scenario in which an assisted fitting measurement using the TOF sensors is depicted, according to various embodiments of the disclosure.

Referring to FIG. 9A, at home where a hardware (H/W) failure is occurred. The video call is placed from a user of the first electronic device (100a) to an inventory (904). Using the TOF interaction controller (514a), all parameters are measured. The parameters may be, for example, but not limited to an inner diameter (ID), an outer diameter (OD), a wall thickness, thread size. The parameters is shared with the partial virtual model controller (510), wherein the parameters is shared along with the call data. The machine learning controller (512) will take inputs from the mechanical system in place and other environmental factors like wear and tear, rust etc.

Referring to FIG. 9B, at the other end of the video call, the TOF interaction controller (514a) will be triggered by background environment observer service. Using the TOF interaction controller (514a), all parameters of the inventory (904) are measured. The parameters are checked and mapped to earlier stored parameters and shared with the partial virtual model controller (510). The inputs from the past sales about the part, new models other environmental factors will be fed to the machine learning controller (512).

Further, the partial virtual model controller (510) will take inputs from the TOF interaction controller (514a) in form of dimension data and the machine learning model output. It will predict the best fit part (906) to be replaced in the existing system as shown in FIGS. 9A and 9B.

The embodiments disclosed herein may be implemented using at least one software program running on at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for generating a virtual model of objects, comprising:
    establishing, by a first electronic device, a video communication session with a second electronic device;
    based on the video communication session being established, obtaining a first set of objects included in a first video frame displayed on the first electronic device and a second set of objects included in a second video frame displayed on the second electronic device;
    determining a first object from the first set of objects to be mapped to a second object from the second set of objects based on environmental observation information tracked in the video communication session, the environmental observation information including at least one of a position of the first object displayed in the first video frame, a type of the second object displayed in the second video frame, conversational data or facial expression;
    predicting attributes of visible portions of the first object and the second object by mapping the first object to the second object;
    obtaining depth information related to the first object and the second object; and
    generating a virtual model of the first object and the second object based on the predicted attributes of the visible portions of the first object and the second object and the depth information related to the first object and the second object.

2. The method of claim 1,
    wherein the first set of objects is displayed in a first preview frame of the first electronic device, and
    wherein the second set of objects is displayed in a second preview frame of the second electronic device.

3. The method as claimed in claim 1,
    wherein the first set of objects is displayed in a first preview frame of the first electronic device, and
    wherein the second set of objects is pre-stored in a memory of the first electronic device.

4. The method of claim 1, wherein the generating of the virtual model comprises:
    generating a first sub-partial virtual model of the first object based on the predicted attributes of the first object and the tracked environmental observation information;
    generating a second sub-partial virtual model of the second object based on the predicted attributes of the second object and the tracked environmental observation information; and
    mapping the first sub-partial virtual model of the first object with the second sub-partial virtual model of the second object to generate the virtual model.

5. The method of claim 4, wherein the generating of the first sub-partial virtual model of the first object comprises:
    determining an attribute of an invisible portion of the first object; and
    applying a machine learning model to the predicted attributes of the visible portions of the first object and the determined attribute of the invisible portion of the first object to generate the first sub-partial virtual model of the first object.

6. The method of claim 5, wherein the determining of the attribute of the invisible portion of the first object comprises:
    generating virtually an axis of similarity for portions of the first object;
    fetching a dimension of the invisible portion of the first object based on the similarity axis; and
    determining a dimension of the invisible portion of the first object based on the fetched dimension of the invisible portion of the first object.

7. The method of claim 4, wherein the generating of the second sub-partial virtual model of the second object comprises:
determining an attribute of an invisible portion of the second object; and
applying a machine learning model to the predicted attributes of a visible portion of the second object and the determined attribute of the invisible portion of the second object to generate the second sub-partial virtual model of the second object.

8. The method of claim 7, wherein the determining of the attribute of the invisible portion of the second object comprises:
generating virtually an axis of similarity for portions of the first object;
fetching a dimension of the invisible portion of the second object based on the similarity axis; and
determining a dimension of the invisible portion of the second object based on the fetched dimension of the invisible portion of the second object.

9. The method of claim 1, wherein the predicting of the attributes of visible portions includes:
determining a first structural component of the first object and a second structural component of the second object;
mapping at least one intersection point of the first structural component of the first object with the second structural component of the second object by modifying a size of at least one of the first object or the second object; and
predicting the attributes of the visible portions of the first object and the second object based on the at least one intersection point.

10. An electronic device comprising:
a communicator configured to communicate with an external device;
a camera configured to capture a first set of objects comprising a first object;
a sensor configured to acquire a first depth information related to the first object; and
at least one processor electrically connected to the communicator, the camera, and the sensor,
wherein the at least one processor is configured to:
establish a video communication session with the external device,
based on the video communication session being established, obtain the first set of objects included in a first video frame displayed on the electronic device and a second set of objects included in a second video frame displayed on the external device,
determine the first object from the first set of objects to be mapped to a second object from the second set of objects based on environmental observation information tracked in the video communication session, the environmental observation information including at least one of a position of the first object displayed in the first video frame, a type of the second object displayed in the second video frame, conversational data or facial expression,
predict attributes of visible portions of the first object and the second object by mapping the first object to the second object,
obtain a first depth information related to the first object from the sensor,
obtain a second depth information related to the second object, and
generate a virtual model of the first object and the second object based on the predicted attributes of the visible portions of the first object and the second object, the first depth information and the second depth information.

11. The electronic device of claim 10,
wherein the at least one processor is further configured to obtain the first set of objects displayed in a first preview frame of the electronic device, and
wherein the second set of objects is displayed in a second preview frame of the external device.

12. The electronic device of claim 10, further comprising a memory,
wherein the at least one processor is further configured to obtain the first set of objects displayed in a first preview frame of the electronic device, and
wherein the second set of objects is pre-stored in the memory.

13. The electronic device of claim 10, wherein the at least one processor is further configured to:
generate a first sub-partial virtual model of the first object based on the predicted attributes of the first object and the tracked environmental observation information,
generate a second sub-partial virtual model of the second object based on the predicted attributes of the second object and the tracked environmental observation information, and
map the first sub-partial virtual model of the first object with the second sub-partial virtual model of the second object to generate the virtual model.

14. The electronic device of claim 13, wherein the generation of the first sub-partial virtual model of the first object comprises:
determination of an attribute of an invisible portion of the first object, and
application of a machine learning model to the predicted attributes of the visible portions of the first object and the determined attribute of the invisible portion of the first object to generate the first sub-partial virtual model of the first object.

15. The electronic device of claim 14, wherein the determination of the attribute of the invisible portion of the first object comprises:
generation virtually of an axis of similarity for portions of the first object,
fetch of a dimension of the invisible portion of the first object based on the similarity axis, and
determination of a dimension of the invisible portion of the first object based on the fetched dimension of the invisible portion of the first object.

16. The electronic device of claim 13, wherein the generation of the second sub-partial virtual model of the second object comprises:
determination of an attribute of an invisible portion of the second object, and
application of a machine learning model to the predicted attributes of the visible portion of the second object and the determined attribute of the invisible portion of the second object to generate the second sub-partial virtual model of the second object.

17. The electronic device of claim 16, wherein the determination of the attribute of the invisible portion of the second object comprises:
generation virtually of an axis of similarity for portions of the first object,
fetch of a dimension of the invisible portion of the second object based on the similarity axis, and determination of a dimension of the invisible portion of the second object based on the fetched dimension of the invisible portion of the second object.

18. The electronic device of claim 10, wherein the prediction of the attributes of visible portions includes:
determination of a first structural component of the first object and a second structural component of the second object,
map of at least one intersection point of the first structural component of the first object with the second structural component of the second object by modifying a size of at least one of the first object or the second object, and
prediction of the attributes of the visible portions of the first object and the second object based on the at least one intersection point.

* * * * *